United States Patent
Tanaka et al.

(10) Patent No.: US 12,116,943 B2
(45) Date of Patent: Oct. 15, 2024

(54) CONTROL SYSTEM FOR DIESEL ENGINE, DIESEL ENGINE, AND CONTROL METHOD FOR DIESEL ENGINE

(71) Applicant: MITSUBISHI HEAVY INDUSTRIES, LTD., Tokyo (JP)

(72) Inventors: Kengo Tanaka, Tokyo (JP); Shintaro Shuto, Tokyo (JP); Shigetoshi Sugata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/283,155

(22) PCT Filed: Mar. 29, 2022

(86) PCT No.: PCT/JP2022/015277
§ 371 (c)(1),
(2) Date: Sep. 20, 2023

(87) PCT Pub. No.: WO2022/224731
PCT Pub. Date: Oct. 27, 2022

(65) Prior Publication Data
US 2024/0175402 A1    May 30, 2024

(30) Foreign Application Priority Data
Apr. 22, 2021   (JP) ................. 2021-072332

(51) Int. Cl.
*F02D 41/00*    (2006.01)
*F02B 37/18*    (2006.01)
*F02D 41/40*    (2006.01)

(52) U.S. Cl.
CPC .......... *F02D 41/0007* (2013.01); *F02B 37/18* (2013.01); *F02D 41/402* (2013.01)

(58) Field of Classification Search
CPC ...... F02B 3/06; F02D 35/027; F02D 41/1497; F02D 41/3035; F02D 41/402; F02D 41/403
See application file for complete search history.

(56) References Cited

U.S. PATENT DOCUMENTS 5,778,857 A * 7/1998 Nakamura .............. F02D 37/02
                                                        123/406.41
6,173,691 B1   1/2001 Yanagihara
(Continued)

FOREIGN PATENT DOCUMENTS

JP    56-50226 A    5/1981
JP    57-52643 A    3/1982
(Continued)

OTHER PUBLICATIONS

International Preliminary Report on Patentability and Written Opinion of the International Searching Authority for International Application No. PCT/JP2022/015277, dated Nov. 2, 2023, with an English translation.
(Continued)

*Primary Examiner* — John Kwon
(74) *Attorney, Agent, or Firm* — Birch, Stewart, Kolasch & Birch, LLP

(57) ABSTRACT

A control system for a diesel engine including a turbocharger and a supercharger as superchargers, includes: a clutch control unit for switching a state of engagement or disengagement of a clutch interposed between the supercharger and a drive shaft of the engine; a fuel injection period control unit for controlling a fuel injection period with respect to the engine based on first association information in which a rotation speed of the engine, an accelerator position, and the fuel injection period are associated with each other in advance; and a fuel injection start timing control unit for controlling a fuel injection start timing with respect to the
(Continued)

engine. The fuel injection start timing control unit is configured to control the fuel injection start timing based on association information which is different depending on an operating state of the supercharger.

8 Claims, 18 Drawing Sheets

(56) References Cited

U.S. PATENT DOCUMENTS

| | | | |
|---|---|---|---|
| 2013/0024097 A1* | 1/2013 | Nada | F02D 41/403 |
| | | | 701/104 |
| 2016/0305356 A1* | 10/2016 | Iwata | F02M 26/05 |
| 2018/0313292 A1* | 11/2018 | Manju | F02B 23/101 |
| 2020/0088125 A1* | 3/2020 | Shirahashi | F02D 41/403 |

FOREIGN PATENT DOCUMENTS

| | | |
|---|---|---|
| JP | 3-202627 A | 9/1991 |
| JP | 7-217476 A | 8/1995 |
| JP | 11-236848 A | 8/1999 |
| JP | 2000-179378 A | 6/2000 |
| JP | 2002-21613 A | 1/2002 |
| JP | 2011-80406 A | 4/2011 |
| JP | 2013-57289 A | 3/2013 |

OTHER PUBLICATIONS

International Search Report for International Application No. PCT/JP2022/015277, dated Jun. 28, 2022.

\* cited by examiner

CONTROL SYSTEM FOR DIESEL ENGINE, DIESEL ENGINE, AND CONTROL METHOD FOR DIESEL ENGINE

TECHNICAL FIELD

The present disclosure relates to a control system for a diesel engine, the diesel engine, and a control method for the diesel engine.

This application claims the priority of Japanese Patent Application No. 2021-072332 filed on Apr. 22, 2021, the content of which is incorporated herein by reference.

BACKGROUND

Some diesel engines include turbochargers and superchargers as superchargers. The turbocharger may not be able to secure a sufficient boost pressure due to insufficient exhaust gas energy for driving a turbine, when the engine is started or at low speed and low load. Therefore, the supercharger is used as a supercharging means for assisting the turbocharger when the engine is started or at low speed and low load (see Patent Document 1). Some superchargers perform supercharging by mechanically driving a compressor from a crankshaft of the engine via a power transmission means such as a gear or a belt.

Operation modes of the diesel engine include a first operation mode in which supercharging is performed by both the turbocharger and the supercharger, and a second operation mode in which supercharging is performed by only the turbocharger. In order to change the above-described operation modes, some diesel engines include a passage switching means, such as valves, for switching an intake passage (see Patent Document 1).

CITATION LIST

Patent Literature

Patent Document 1: JP2011-80406A

SUMMARY

Technical Problem

When the operation mode of the diesel engine is switched, an operating state (a drive state or a stop state) of the supercharger changes. Consequently, a scavenging pressure or a mechanical loss of the engine changes, which may suddenly change the fuel consumption rate or torque of the engine. If the control system for the diesel engine performs control to obtain a fuel injection period (fuel injection amount) from an accelerator position or a rotation speed of the engine input from a driver and to obtain a fuel injection period (fuel injection amount) from the rotation speed of the engine or the fuel injection period (fuel injection amount), since an influence by the sudden change in scavenging pressure or mechanical loss of the engine when the above-described operation mode is switched is not taken into account, a change in torque of the engine, which is not intended by the driver of a vehicle equipped with the diesel engine, occurs, which may require an additional accelerator adjustment by the driver when the above-described operation mode is switched.

In view of the above, an object of at least one embodiment of the present disclosure is to provide a control system for a diesel engine, the diesel engine, and a control method for the diesel engine, which can suppress a fluctuation in torque that can occur when the operating state of the supercharger is switched.

Solution to Problem

A control system for a diesel engine according to an embodiment of the present disclosure is a control system for a diesel engine including a turbocharger and a supercharger as superchargers, including: a clutch control unit for switching a state of engagement or disengagement of a clutch interposed between the supercharger and a drive shaft of the engine; a fuel injection period control unit for controlling a fuel injection period with respect to the engine based on first association information in which a rotation speed of the engine, an accelerator position, and the fuel injection period are associated with each other in advance; and a fuel injection start timing control unit for controlling a fuel injection start timing with respect to the engine. The control system includes: second association information in which the rotation speed of the engine, the fuel injection period, and the fuel injection start timing are associated with each other in advance, in a drive state of the supercharger; and third association information in which the rotation speed of the engine, the fuel injection period, and the fuel injection start timing are associated with each other in advance, in a stop state of the supercharger, the third association information being different from the second association information. The fuel injection start timing control unit is configured to control the fuel injection start timing based on the second association information when the supercharger is in the drive state, and is configured to control the fuel injection start timing based on the third association information when the supercharger is in the stop state.

A diesel engine according to an embodiment of the present disclosure, includes the control system.

A control method for a diesel engine according to an embodiment of the present disclosure is a control method for a diesel engine including a turbocharger and a supercharger as superchargers, including: a clutch switch step of switching a state of engagement or disengagement of a clutch interposed between the supercharger and a drive shaft of the engine; a fuel injection period control step of controlling a fuel injection period with respect to the engine based on first association information in which a rotation speed of the engine, an accelerator position, and the fuel injection period are associated with each other in advance; and a fuel injection start timing control step of controlling a fuel injection start timing with respect to the engine. The fuel injection start timing control step includes: a first fuel injection start timing control step of controlling the fuel injection start timing when the supercharger is in a drive state, based on second association information in which the rotation speed of the engine, the fuel injection period, and the fuel injection start timing are associated with each other in advance, in the drive state of the supercharger; and a second fuel injection start timing control step of controlling the fuel injection start timing when the supercharger is in a stop state, based on third association information in which the rotation speed of the engine, the fuel injection period, and the fuel injection start timing are associated with each other in advance, in the stop state of the supercharger, the third association information being different from the second association information.

Advantageous Effects

According to at least one embodiment of the present disclosure, provided are a control system for a diesel engine, the diesel engine, and a control method for the diesel engine, which can suppress a fluctuation in torque that can occur when an operating state of a supercharger is switched.

DETAILED DESCRIPTION

Figure 1:
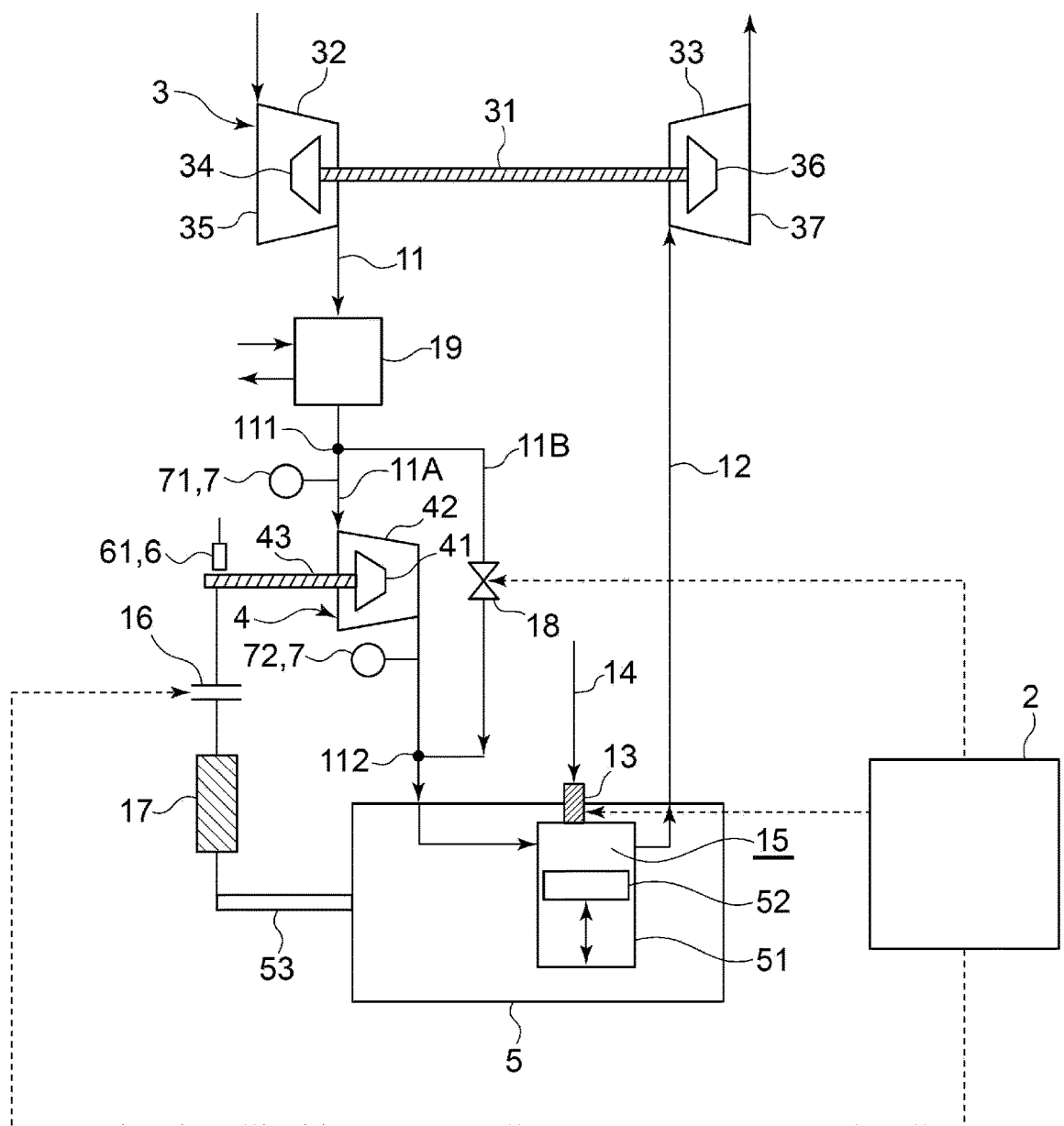
FIG. 1 is a schematic configuration diagram schematically showing the configuration of a diesel engine including a control system according to an embodiment of the present disclosure.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

(Diesel Engine)

FIG. 1 is a schematic configuration diagram schematically showing the configuration of a diesel engine including a control system according to an embodiment of the present disclosure. A control system 2 for a diesel engine 1 according to some embodiments of the present disclosure is mounted on the diesel engine 1 including a turbocharger 3 and a supercharger 4 as superchargers, as shown in FIG. 1. In other words, the diesel engine 1 includes the control system 2, the turbocharger 3, and the supercharger 4. In each of the following embodiments, a two-stroke diesel engine will be described as an example of the diesel engine 1, but the present disclosure is applicable to the diesel engine 1 other than the two-stroke diesel engine.

The diesel engine 1 further includes an engine body 5 configured to generate power by internally burning fuel, an intake line 11 for compressing and supplying intake air (gas, for example, air) to the engine body 5, an exhaust line 12 for introducing exhaust air discharged from the engine body 5, a fuel injection device (fuel injection valve) 13 configured to inject liquid fuel into the engine body 5, and a fuel supply line 14 for supplying the liquid fuel to the fuel injection device 13. Hereinafter, the engine body 5 may simply be referred to as the engine 5.

The engine 5 includes at least one cylinder 51, at least one piston 52 reciprocatingly housed in the at least one cylinder 51 along the axial direction, and a drive shaft 53 for converting the reciprocation of the at least one piston 52 into a rotational force. The engine 5 internally includes a combustion chamber 15 defined by the cylinder 51 and the piston 52. The engine 5 compresses and heats a gas, which is supplied to the combustion chamber 15 through the intake line 11, by the piston 52 to a temperature equal to or higher than an ignition point of the above-described liquid fuel. The liquid fuel is self-ignited by injecting the liquid fuel from the fuel injection device 13 to the compressed and heated gas. The piston 52 is pushed out by expansion of a combustion gas generated by the self-ignition. Then, the reciprocation of the piston 52 is converted into the rotational force (power) by the drive shaft 53 via a connecting rod (not shown) or the like.

The fuel injection device 13 is telecommunicably connected to the control system 2 via a wire or wirelessly. The fuel injection device 13 is configured such that a fuel injection start timing TS (injection crank angle) and a fuel injection period TQ with respect to the engine 5 are controlled by the control system 2. In the illustrated embodiment, the fuel injection device 13 is connected to a common rail (not shown) in which high-pressure liquid fuel is accumulated, and is configured to inject the high-pressure liquid fuel (unburned fuel) to the combustion chamber 15. The fuel injection device 13 may be configured to inject the high-pressure liquid fuel (unburned fuel) to the vicinity of the combustion chamber 15 on the intake line 11.

(Turbocharger)

The turbocharger 3 is configured to be driven by energy of an exhaust gas discharged from the engine 5 and to compress gas (for example, air) introduced into the engine 5. The turbocharger 3 includes a rotational shaft 31, a compressor 32, and a turbine 33. The compressor 32 includes an impeller 34 disposed on the above-described intake line 11, and a compressor housing 35 for rotatably accommodating the impeller 34. The impeller 34 is mechanically connected to one side of the rotational shaft 31. The turbine 33 includes a turbine rotor 36 disposed on the above-described exhaust line 12, and a turbine housing 37 for rotatably accommodating the turbine rotor 36. The turbine rotor 36 is mechanically connected to another side of the rotational shaft 31.

The gas having passed through the impeller 34 of the compressor 32 is introduced to the combustion chamber 15 of the engine 5 through the intake line 11 and is used for combustion in the combustion chamber 15. The exhaust gas generated by the combustion in the combustion chamber 15 is introduced to the turbine rotor 36 of the turbine 33 through the exhaust line 12. The turbocharger 3 is configured to rotate the turbine rotor 36 by the energy of the exhaust gas discharged from the engine 5. The impeller 34 is mechanically coupled to the turbine rotor 36 via the rotational shaft 31, and thus rotates in conjunction with the rotation of the turbine rotor 36. With the rotation of the impeller 34, the turbocharger 3 is configured to compress the gas passing through the impeller 34, increase the density of the above-described gas, and send the above-described gas to the engine 5.

(Supercharger)

The diesel engine 1 includes a clutch 16 interposed between the supercharger 4 and the drive shaft 53 of the engine 5. The supercharger 4 is configured to be driven by power extracted from the drive shaft 53 of the engine 5 and to compress the gas introduced into the engine 5. The supercharger 4 includes an impeller 41 disposed downstream of the intake line 11 relative to the impeller 34 of the compressor 32, a housing 42 for rotatably accommodating the impeller 41, and a rotational shaft 43 on one side of which the impeller 41 is mounted. The rotational shaft 43 is mechanically coupled at another side to the drive shaft 53 of the engine 5 via a power transmission device including the clutch 16. As shown in FIG. 1, the diesel engine 1 may include a gear mechanism 17 interposed between the drive shaft 53 and the clutch 16 and capable of setting a predetermined gear ratio.

The above-described intake line 11 includes a first intake passage 11A which connects the compressor 32 and the engine 5 and is provided with the impeller 41 of the supercharger 4 in the middle, and a second intake passage (bypass passage) 11B which bypasses the supercharger 4 and connects the compressor 32 and the engine 5. In the illustrated embodiment, the second intake passage 11B branches off from the first intake passage 11A at a branch section 111 located upstream of the impeller 41 of the supercharger 4, and joins the first intake passage 11A at a confluent section 112 located downstream of the impeller 41 of the supercharger 4. The "upstream side" means the upstream side in a flow direction of the gas flowing through the intake line 11, and the "downstream side" means the downstream side in the flow direction of the gas flowing through the intake line 11.

The diesel engine 1 includes a bypass valve 18 disposed on the second intake passage 11B, and an intercooler 19 disposed upstream of the above-described branch section 111 of the first intake passage 11A. The bypass valve 18 is telecommunicably connected to the control system 2 via a wire or wirelessly. The bypass valve 18 includes a motor and an actuator (not shown) which operate in accordance with open/close instruction (OPEN/CLOSE signal) sent from the control system 2, and is configured to open/close the second intake passage 11B in accordance with open/close instruction from the control system 2. The intercooler 19 is a heat exchanger for cooling the gas passing through the intercooler 19.

(Control Method, Control System for Diesel Engine)

Figure 2:
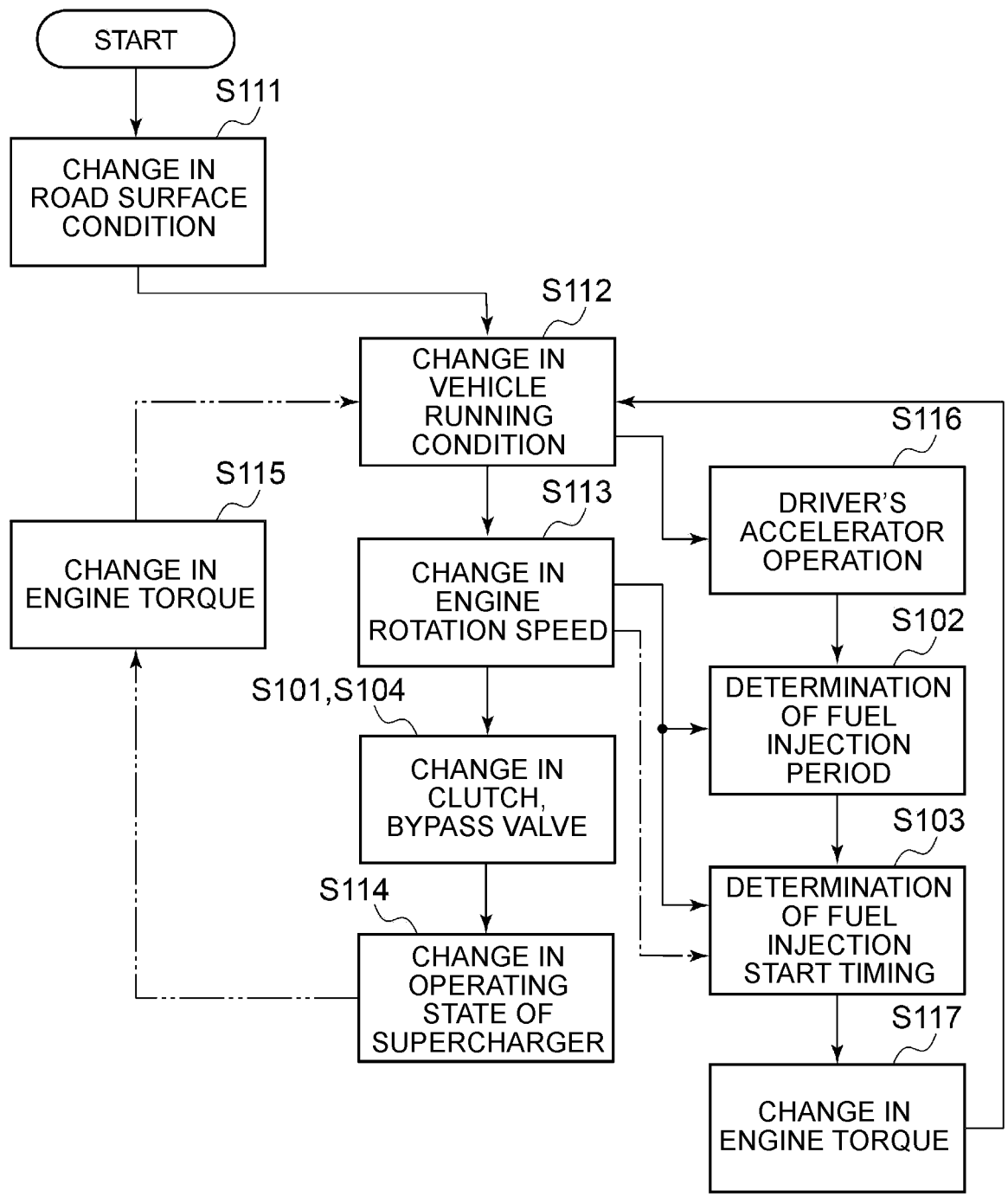
FIG. 2 is a flowchart showing an example of a control method for the diesel engine according to an embodiment of the present disclosure.
Figure 3:
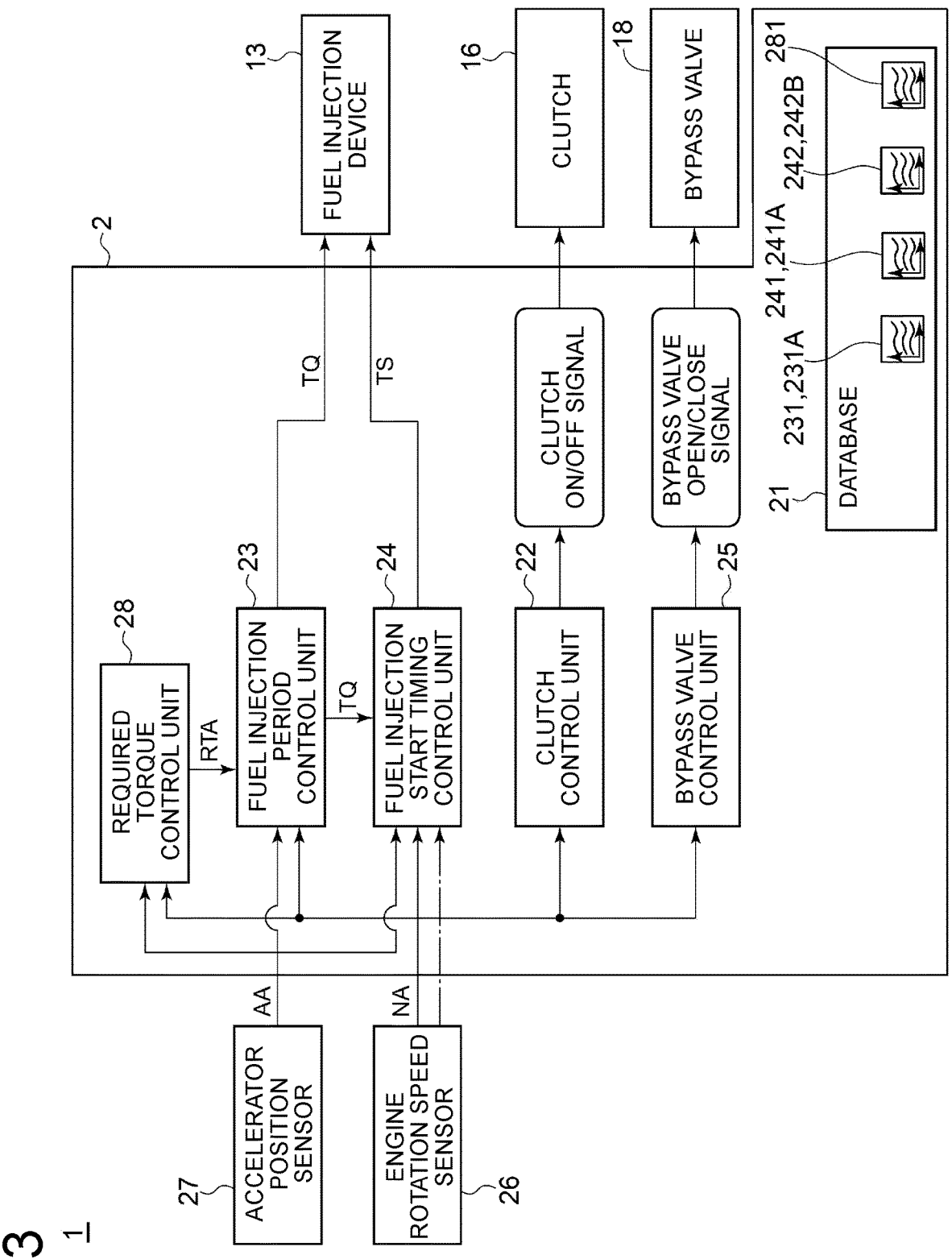
FIG. 3 is an explanatory diagram for describing a function of the control system for the diesel engine according to an embodiment of the present disclosure.

FIG. 2 is a flowchart showing an example of the control method for the diesel engine according to an embodiment of the present disclosure. FIG. 3 is an explanatory diagram for describing a function of the control system for the diesel engine according to an embodiment of the present disclosure.

A control method 100 for the diesel engine 1 according to some embodiments includes a clutch switch step S101, a fuel injection period control step S102, a fuel injection start timing control step S103, and a bypass valve control step S104, as shown in FIG. 2. Some steps in the control method 100 may be performed by the control system 2. Further, some steps in the control method 100 may be performed by using a system or a device other than the control system 2, or may be performed manually.

The control system 2 includes a database unit 21, a clutch control unit 22, a fuel injection period control unit 23, a fuel injection start timing control unit 24, and a bypass valve control unit 25, as shown in FIG. 3.

The control system 2 is an electronic control unit for controlling the diesel engine 1. The control system 2 is configured as a microcomputer including a CPU (processor), a memory such as a ROM or a RAM, a storage device such as an external storage device, an I/O interface, a communication interface, and the like which are not shown. In one embodiment, the control system 2 includes an engine control unit (ECU). The control system 2 may implement the aforementioned each unit by, for example, causing the CPU to operate (for example, calculate data) in accordance with an instruction of a program loaded to a main storage device of the above-described memory.

In the illustrated embodiment, as shown in FIG. 3, the diesel engine 1 includes a rotation speed sensor 26 configured to measure a rotation speed NA of the engine 5, and an accelerator sensor 27 configured to measure an accelerator position AA of the engine 5. The control system 2 is telecommunicably connected to the rotation speed sensor 26 or the accelerator sensor 27 via a wire or wirelessly. The rotation speed NA measured by the rotation speed sensor 26 or the accelerator position AA measured by the accelerator sensor 27 is sent to the control system 2. The control system 2 is configured to calculate a torque (actual torque) TA of the engine 5 based on input signals from various sensors (the rotation speed sensor 26, the accelerator sensor 27, etc.) provided in the diesel engine 1. The control system 2 may acquire the torque TA by a torque sensor (not shown). The database unit 21 stores information (the rotation speed NA, the accelerator position AA, etc.) acquired by the sensors provided in the diesel engine 1, or information (the torque TA, etc.) calculated based on the information acquired by the sensors. The respective units (the clutch control unit 22, the fuel injection period control unit 23, the fuel injection start timing control unit 24, the bypass valve control unit 25, and the like) of the control system 2 are configured to acquire necessary information from the database unit 21.

As shown in FIG. 2, in the control method 100 for the diesel engine 1, a vehicle running condition changes (S112) in response to a change in road surface condition on which a vehicle equipped with the diesel engine 1 runs (S111), and the rotation speed NA of the engine 5 changes (S113) in response to the change in vehicle running condition (S112). The above-described clutch 16 or bypass valve 18 is switched in response to the change in the rotation speed NA of the engine 5 (S113). In other words, the clutch switch step S101 or the bypass valve control step S104 is performed in response to the change in the rotation speed NA of the engine 5 (S113). Consequently, an operating state (a drive state or a stop state) of the supercharger 4 changes (S114) and the torque TA of the engine 5 changes in response to the change in operating state of the supercharger 4 (S115), changing the vehicle running condition (S112).

As shown in FIG. 2, a driver who operates the vehicle may operate an accelerator (S116) in order to cope with the change in vehicle running condition (S112). This accelerator operation changes the accelerator position AA of the engine 5. The fuel injection period TQ or the fuel injection start timing TS is determined which is according to the changed accelerator position AA of the engine 5 or the rotation speed NA of the engine 5 after the change in step S113 described above. In other words, the fuel injection period control step S102 or the fuel injection start timing control step S103 is performed in response to the change in the accelerator position AA of the engine 5 or the rotation speed NA of the engine 5. Since the torque TA of the engine 5 is changed (S117) by changing any of the accelerator position AA, the fuel injection period TQ, or the fuel injection start timing TS, the vehicle running condition changes (S112).

(Clutch Switch Step)

The clutch switch step S101 includes switching the state of engagement or disengagement of the clutch 16. In the illustrated embodiment, the clutch control unit 22 performs the clutch switch step S101. The clutch 16 is telecommunicably connected to the control system 2 via a wire or wirelessly. The clutch 16 is configured such that the state of engagement or disengagement of the clutch 16 can be changed in accordance with an instruction (clutch ON/OFF signal) from the clutch control unit 22. Specifically, when the signal sent from the clutch control unit 22 to the clutch 16 is switched from the ON signal to the OFF signal, the clutch 16 is switched from the engaged state to the disengaged state. Further, when the signal sent from the clutch control unit 22 to the clutch 16 is switched from the OFF signal to the ON signal, the clutch 16 is switched from the disengaged state to the engaged state. Either one of the clutch ON/OFF signals may be a signal that does not transmit a signal from the clutch control unit 22 to the clutch 16.

When the clutch 16 is in the engaged state, power is transmitted from the drive shaft 53 of the engine 5 to the supercharger 4 via the clutch 16, and thus the supercharger 4 is driven (drive state). When the clutch 16 is in the engaged state, the bypass valve 18 is closed and the gas flowing through the intake line 11 passes between the branch section 111 and the confluent section 112 of the first intake passage 11A, that is, passes through the impeller 41. That is, when the clutch 16 is in the engaged state, both the turbocharger 3 and the supercharger 4 are driven as the superchargers. The gas supplied to the engine 5 is supercharged by the compressor 32 of the turbocharger 3 and the supercharger 4.

When the clutch 16 is in the disengaged state, no power is transmitted from the drive shaft 53 of the engine 5 to the supercharger 4, and thus the supercharger 4 is not driven (stop state). When the clutch 16 is in the disengaged state, the bypass valve 18 is open and the gas flowing through the intake line 11 passes through the second intake passage 11B. That is, when the clutch 16 is in the engaged state, only the turbocharger 3 is driven as the supercharger. The gas supplied to the engine 5 is compressed by the compressor 32 of the turbocharger 3.

Figure 4:
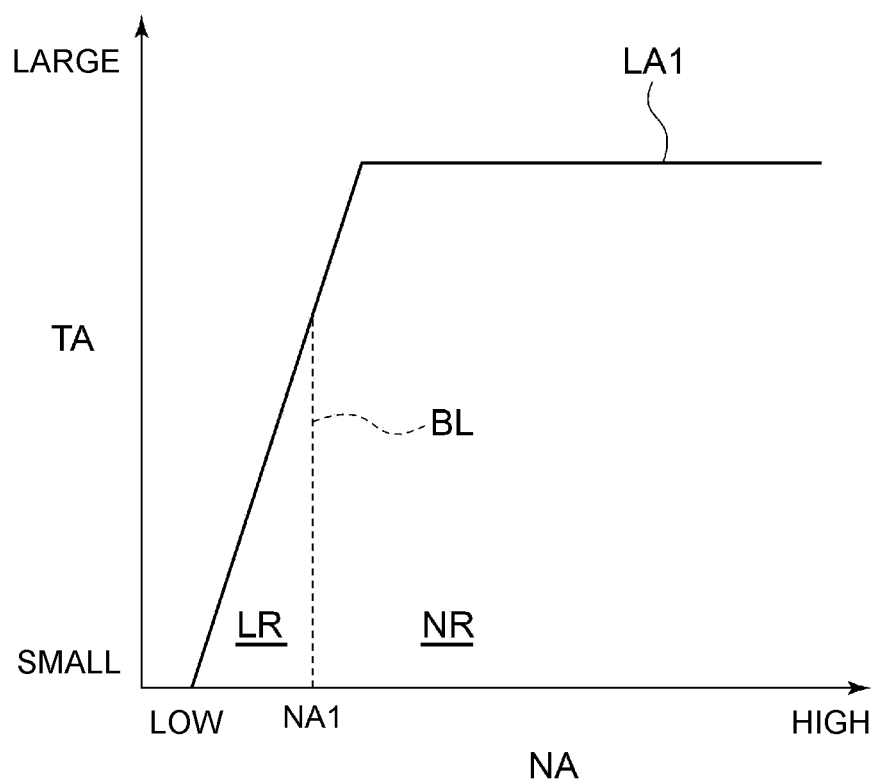
FIG. 4 is an explanatory graph for describing control of a clutch control unit in an embodiment.

FIG. 4 is an explanatory graph for describing control of the clutch control unit in an embodiment. FIG. 4 is a graph in which the rotation speed NA of the engine 5 is plotted on the horizontal axis and the torque TA of the engine 5 is plotted on the vertical axis. FIG. 4 shows a designed engine operating line LA1 and a designed boundary line BL. As illustrated, the boundary line BL is a boundary between a low-flow operating region LR (a left side in the figure) where supercharging by the supercharger 4 is required and a normal operating region NR (a right side in the figure) where supercharging by the supercharger 4 is not required.

The clutch control unit 22 switches the state of the clutch 16 in accordance with the operating state (at least either of the rotation speed NA or the torque TA) of the engine 5. Specifically, when the operating state of the engine 5 shifts from the low-flow operating region LR to the normal operating region NR, the state of the clutch 16 is switched from the engaged state to the disengaged state to stop the supercharger 4 (the supercharger 4 is switched from the drive state to the stop state). Further, when the operating state of the engine 5 shifts from the normal operating region NR to the low-flow operating region LR, the state of the clutch 16 is switched from the disengaged state to the engaged state to drive the supercharger 4 (the supercharger 4 is switched from the stop state to the drive state).

In the illustrated embodiment, a set value NA1 of the rotation speed (set rotation speed) of the engine 5 is set in advance to indicate the above-described boundary line BL. This set value NA1 is stored in the database unit 21 prior to the clutch switch step S101. The clutch control unit 22 switches the state of the clutch 16 when the rotation speed NA of the engine 5 passes the set value NA1. Specifically, when the rotation speed NA of the engine 5 passes the set value NA1 while the rotation speed NA is increasing, the state of the clutch 16 is switched from the engaged state to the disengaged state to stop the supercharger 4. Further, when the rotation speed NA of the engine 5 passes the set value NA1 while the rotation speed NA is decreasing, the state of the clutch 16 is switched from the disengaged state to the engaged state to drive the supercharger 4.

(Bypass Valve Control Step)

The bypass valve control step S104 includes switching an open/closed state of the bypass valve 18 when the state of the clutch 16 is switched in the clutch switch step S101. In the illustrated embodiment, the bypass valve control unit 25 performs the bypass valve control step S104. The bypass valve 18 is configured such that the open/closed state of the bypass valve 18 can be changed in accordance with the open/close instruction (OPEN/CLOSE signal) from the bypass valve control unit 25 (control system 2). Specifically, when the signal sent from the bypass valve control unit 25 to the bypass valve 18 is switched from OPEN signal to CLOSE signal, the bypass valve 18 is switched from the open state to the closed state. Further, when the signal sent from the bypass valve control unit 25 to the bypass valve 18 is switched from CLOSE signal to OPEN signal, the bypass valve 18 is switched from the closed state to the open state. Either one of OPEN/CLOSE signals may be a signal that does not transmit a signal from the bypass valve control unit 25 to the bypass valve 18.

The bypass valve control unit 25 instructs the bypass valve 18 to open when the state of the clutch 16 is switched from the engaged state to the disengaged state. Further, the bypass valve control unit 25 instructs the bypass valve 18 to close when the state of the clutch 16 is switched from the disengaged state to the engaged state. The instruction from the bypass valve control unit 25 to the bypass valve 18 may be issued after a predetermined period of time has elapsed since the state of the clutch 16 is switched.

(Fuel Injection Period Control Step)

The fuel injection period control step S102 includes controlling the fuel injection period TQ with respect to the engine 5 based on first association information 231 in which the rotation speed NA of the engine 5, the accelerator position AA, and the fuel injection period TQ are associated with each other in advance. In the illustrated embodiment, the fuel injection period control unit 23 performs the fuel injection period control step S102. The first association information 231 is stored in the database unit 21 in advance prior to the fuel injection period control step S102. The first association information 231 includes a fuel injection period map 231A in which the fuel injection period TQ is defined in accordance with the rotation speed NA of the engine 5 and the accelerator position AA.

Figure 5:
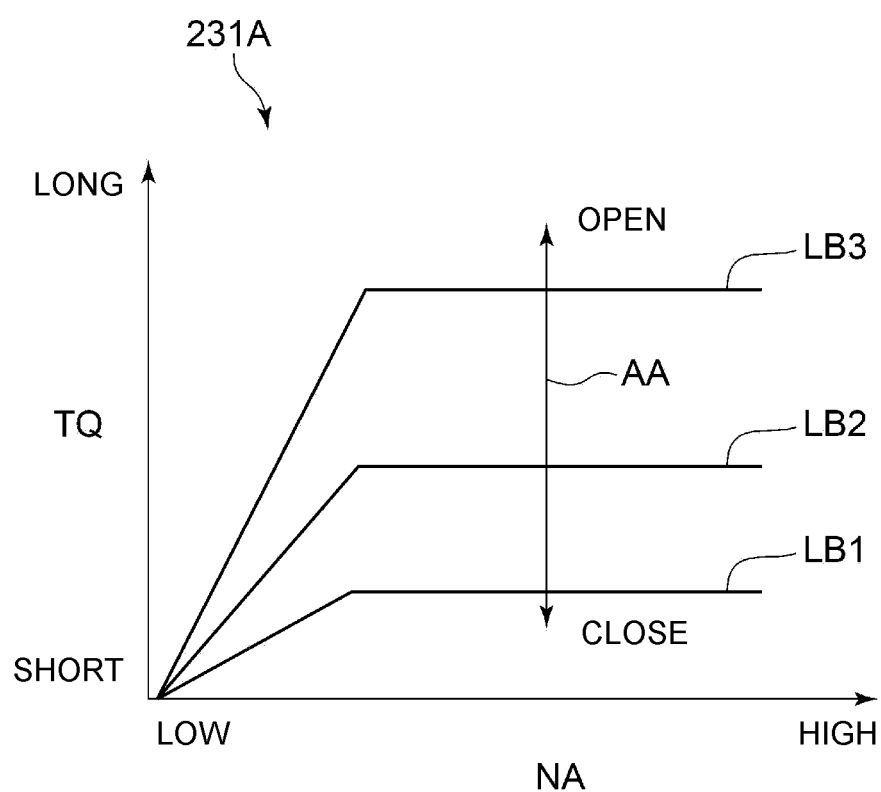
FIG. 5 is an explanatory graph for describing control of a fuel injection period control unit in an embodiment.

FIG. 5 is an explanatory graph for describing control of the fuel injection period control unit in an embodiment. FIG. 5 shows the fuel injection period map 231A in which the rotation speed NA of the engine 5 is plotted on the horizontal axis and the fuel injection period TQ is plotted on the vertical axis. The fuel injection period map 231A shows a plurality of curves LB1, LB2, and LB3 representing a relationship between the rotation speed NA of the engine 5 and the fuel injection period TQ for each accelerator position AA. With a position on the fuel injection period map 231A, the fuel injection period TQ corresponding to the rotation speed NA of the engine 5 and the accelerator position AA can be obtained from the rotation speed NA and the accelerator position AA. The fuel injection period control unit 23 uses the fuel injection period map 231A (first association information 231) to calculate the fuel injection period TQ corresponding to the rotation speed NA of the engine 5 and the accelerator position AA, and instructs the fuel injection device 13 to inject the liquid fuel during the calculated fuel injection period TQ. The fuel injection device 13 injects the liquid fuel by an amount corresponding to the fuel injection period TQ.

In the illustrated embodiment, as shown in FIG. 3, the above-described control system 2 further includes a required torque control unit 28. The required torque control unit 28 is configured to calculate a required torque RTA of the engine 5 from the rotation speed NA of the engine 5 measured by the rotation speed sensor 26 and the accelerator position AA measured by the accelerator sensor 27, based on a torque map 281 in which the rotation speed NA, the accelerator position AA, and the required torque RTA of the engine 5 are associated with each other in advance. The above-described fuel injection period control unit 23 calculates the fuel injection period TQ suitable for the required torque RTA calculated by the required torque control unit 28.

Since there is a correlation between the fuel injection period TQ and the fuel injection amount, the fuel injection amount may be used instead of the fuel injection period TQ as a parameter in the fuel injection period control step S102 (fuel injection period control unit 23). Further, it is only necessary that the first association information 231 is information that uses the rotation speed NA of the engine 5 and the accelerator position AA as input information and can output the fuel injection period TQ (or the fuel injection amount) corresponding to the input information, and the first association information 231 includes a list, a table, a map, a function, a machine learning model, or the like indicating a correspondence relationship between the above-described input information and the above-described output information. The first association information 231 may be created based on routine test data, or may be created based on past performance values, experimental values, numerical analysis results, etc. other than the routine test data.

Figure 6:
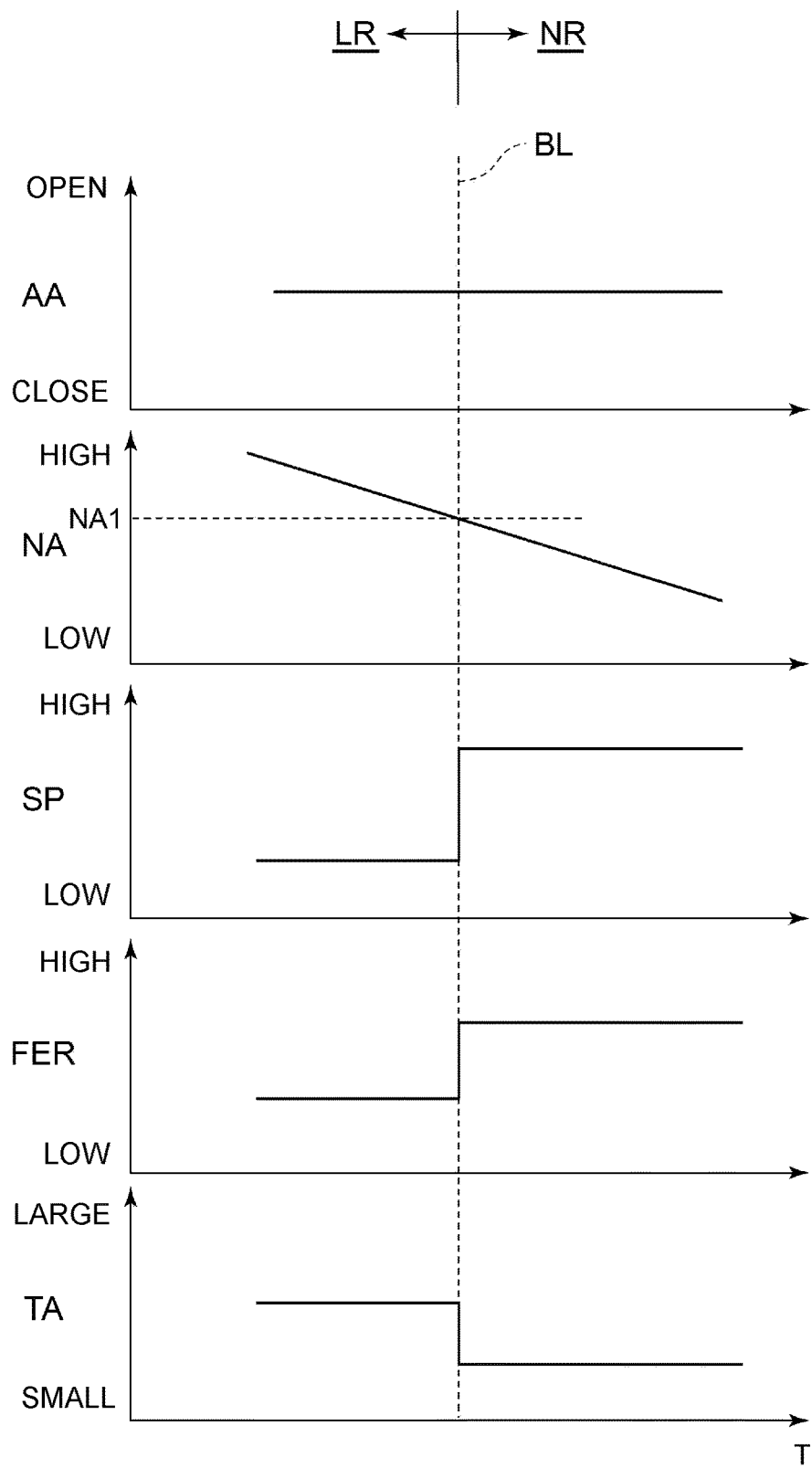
FIG. 6 is an explanatory graph for describing changes in state when a state of a clutch of the diesel engine is switched in a comparative example.

FIG. 6 is an explanatory graph for describing changes in state when the state of the clutch of the diesel engine is switched in a comparative example. FIG. 6 shows the changes in state of the diesel engine 1 when the rotation speed NA of the engine 5 passes the set value NA1 while the rotation speed NA is decreasing, with an elapsed time T being plotted on the horizontal axis. When the rotation speed NA of the engine 5 passes the set value NA1, the clutch control unit 22 switches the state of the clutch 16 from the disengaged state to the engaged state. In FIG. 6, the accelerator position AA is constant before and after the state of the clutch 16 is switched.

By switching the state of the clutch 16 in the clutch switch step S101 described above, the operating state of the supercharger 4 changes (S114) and the torque TA of the engine 5 changes in response to the change in operating state of the supercharger 4 (S115). Specifically, as shown in FIG. 6, if the state of the clutch 16 is switched from the disengaged state to the engaged state, the supercharger 4 enters the drive state and the gas supplied to the engine 5 is supercharged not only by the compressor 32 but also by the supercharger 4, sharply raising a scavenging pressure SP of the engine 5. Further, part of the power generated by the engine 5 is used by the supercharger 4, sharply increasing the mechanical loss of the engine 5. Due to the sudden changes in the scavenging pressure SP and the mechanical loss of the engine 5, a fuel consumption rate FER of the engine 5 also changes suddenly. If the state of the clutch 16 is switched from the engaged state to the disengaged state, the supercharger 4 enters the stop state, the scavenging pressure SP of the engine 5 sharply drops, and the mechanical loss of the engine 5 sharply decreases. In this case as well, the fuel consumption rate FER of the engine 5 suddenly changes due to the sudden changes in the scavenging pressure SP and the mechanical loss of the engine 5. If the fuel consumption rate FER of the engine 5 changes, the torque TA of the engine 5 also changes.

Figure 7:
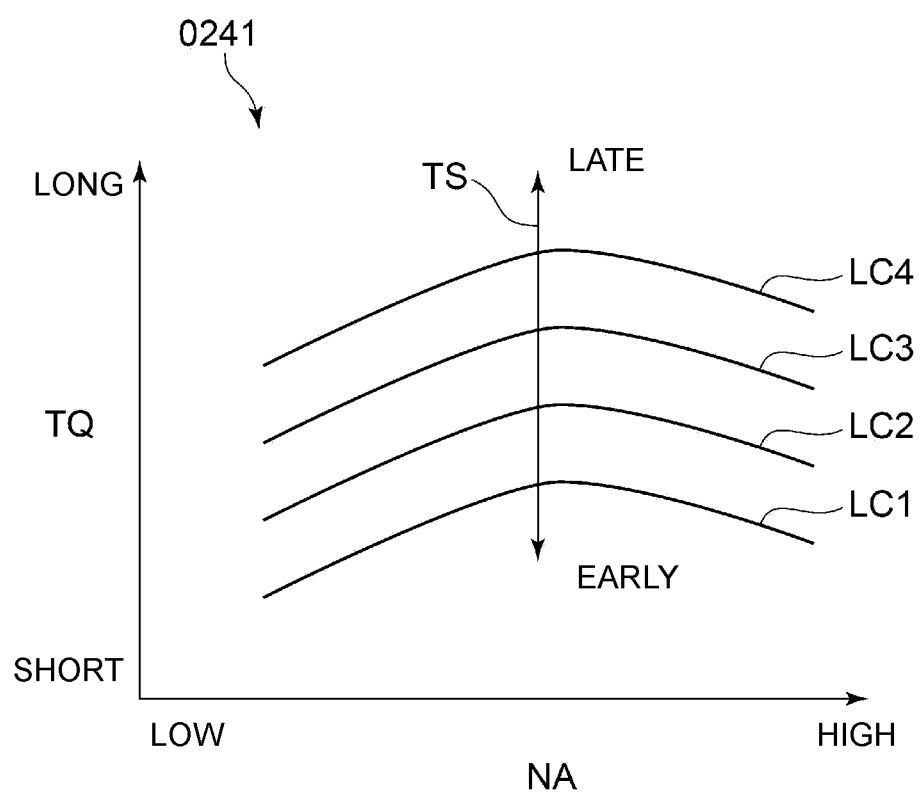
FIG. 7 is an explanatory graph for describing control of a fuel injection start timing control unit in a comparative example.

FIG. 7 is an explanatory graph for describing control of the fuel injection start timing control unit in a comparative example. FIG. 7 shows a fuel injection start timing control map 0241 in which the rotation speed NA of the engine 5 is plotted on the horizontal axis and the fuel injection period TQ is plotted on the vertical axis. The fuel injection start timing control map 0241 shows a plurality of curves LC1, LC2, LC3, and LC4 representing the relationship between the rotation speed NA of the engine 5 and the fuel injection period TQ for each fuel injection start timing TS (injection crank angle) with respect to the engine 5. The fuel injection start timing control unit according to the comparative example uses the fuel injection start timing control map 0241 to calculate the fuel injection start timing TS corresponding to the rotation speed NA of the engine 5 and the fuel injection period TQ, and instructs the fuel injection device 13 to start injecting the liquid fuel at the calculated fuel injection start timing TS. In the control by the fuel injection start timing control unit according to the comparative example, when the operating state of the supercharger 4 is switched in response to the change in the rotation speed NA of the engine 5, switching of the fuel injection start timing control map as described later is not performed.

Since the control by the fuel injection start timing control unit according to the comparative example does not consider the influence by the sudden changes in the scavenging pressure SP and the mechanical loss of the engine 5 when the operating state of the supercharger 4 is switched, as shown in FIG. 6, when the operating state of the supercharger 4 is switched, the change in the torque TA of the engine 5 unintended by the driver of the vehicle equipped with the diesel engine 1 occurs (S115), which may require additional accelerator adjustment by the driver (S116).

(Fuel Injection Start Timing Control Step)

The fuel injection start timing control step S103 includes controlling the fuel injection start timing TS with respect to the engine 5 based on a control map 241A, 242A (association information 241, 242) corresponding to the operating state of the supercharger 4. Specifically, the fuel injection start timing control step S103 includes a first fuel injection start timing control step of controlling the fuel injection start timing TS based on the control map 241A (association information 241) when the supercharger 4 is in the drive state, and a second fuel injection start timing control step of controlling the fuel injection start timing TS based on the control map 242A (association information 242) when the supercharger 4 is in the stop state. The above-described step S113 (see FIG. 2) includes determining that the operating state of the supercharger 4 is changed (switched) when the rotation speed NA of the engine 5 passes the set value NA1, and switching the control map 241A, 242A (association information 241, 242) used to control the fuel injection start timing TS. In the illustrated embodiment, the fuel injection start timing control unit 24 performs the fuel injection start timing control step S103. In the illustrated embodiment, the above-described fuel injection start timing control unit 24 calculates the fuel injection start timing TS suitable for the required torque RTA calculated by the required torque control unit 28.

The torque TA of the engine 5 can be increased by advancing the fuel injection start timing TS with respect to the engine 5, when the control map 241A, 242A is switched. The torque TA of the engine 5 can be decreased by delaying the fuel injection start timing TS with respect to the engine 5, when the control map 241A, 242A is switched. The fuel injection start timing control unit 24 changes the fuel injection start timing TS with respect to the engine 5 such that the torque TA of the engine 5 after the control map 241A, 242A is switched is the same as the torque TA of the engine 5 before the control map 241A, 242A is switched or a difference therebetween is small. The fuel injection start timing control unit 24 may change the fuel injection start timing TS with respect to the engine 5 such that the fuel consumption rate FER of the engine 5 after the control map 241A, 242A is switched is the same as the fuel consumption rate FER of the engine 5 before the control map 241A, 242A is switched or a difference therebetween is small. Further, the fuel injection start timing control unit 24 may change the fuel injection start timing TS with respect to the engine 5 such that the scavenging pressure SP of the engine 5 after the control map 241A, 242A is switched is the same as the scavenging pressure SP of the engine 5 before the control map 241A, 242A is switched or a difference therebetween is small.

The above-described fuel injection period control unit 23 (fuel injection period control step S102) may obtain not only the fuel injection period TQ but also the fuel injection start timing TS corresponding to the fuel injection period TQ. The above-described fuel injection start timing control unit 24 (fuel injection start timing control step S103) may correct the fuel injection start timing TS obtained in the fuel injection period control unit 23 (fuel injection period control step S102) or may change the fuel injection start timing TS obtained in the fuel injection start timing control unit 24 (fuel injection start timing control step S103).

The control method 100 for the diesel engine 1 according to some embodiments includes the above-described clutch switch step S101, the above-described fuel injection period control step S102, and the above-described fuel injection start timing control step S103, as shown in FIG. 2. The fuel injection start timing control step S103 includes the above-described first fuel injection start timing control step and the above-described second fuel injection start timing control step.

With the above method, since the fuel injection start timing control step S103 includes controlling the fuel injection start timing TS based on the association information (the second association information 241, the third association information 242) which is different depending on the operating state (the drive state or the stop state) of the supercharger 4, the fuel injection start timing TS can be an appropriate timing according to the operating state of the supercharger 4. The fuel consumption rate FER or the torque TA of the engine 5 can be changed by changing the fuel injection start timing TS with respect to the engine 5 in the fuel injection start timing control step S103. Since the fuel injection start timing control step S103 includes changing the fuel injection start timing TS with respect to the engine 5 such that the fuel consumption rate FER or the torque TA of the engine 5 after the operating state of the supercharger 4 changes is the same as the fuel consumption rate FER or the torque TA of the engine 5 before the operating state of the supercharger 4 changes or a difference therebetween is small, it is possible to suppress a fluctuation in the fuel consumption rate FER or the torque TA of the engine 5, which can be caused when the operating state of the supercharger 4 changes. By suppressing the fluctuation in the fuel consumption rate FER or the torque TA of the engine 5, which can be caused when the operating state of the supercharger 4 changes, the driver's accelerator adjustment for keeping the torque TA constant becomes unnecessary. Further, with the above method, the control of the fuel injection period TQ in the fuel injection period control step S102 may not be changed, making it possible to suppress the complication of the above-described control method 100.

The control system 2 for the diesel engine 1 according to some embodiments includes the above-described clutch control unit 22, the above-described fuel injection period control unit 23, and the above-described fuel injection start timing control unit 24, as shown in FIG. 3. The above-described control system 2 includes the second association information 241 in which the rotation speed NA of the engine, the fuel injection period TQ, and the fuel injection start timing TS are associated with each other in advance, in the drive state of the supercharger 4, and the third association information 243 in which the rotation speed NA of the engine, the fuel injection period TQ, and the fuel injection start timing TS are associated with each other in advance, in the stop state of the supercharger 4. The third association information 242 is information different from the second association information 241.

The second association information 241 and the third association information 242 are stored in the database unit 21 in advance prior to the fuel injection start timing control step S103. The second association information 241 includes the first fuel injection start timing control map 241A where the fuel injection start timing TS is defined which corresponds to the rotation speed NA of the engine and the fuel injection period TQ in the drive state of the supercharger 4. The third association information 242 includes the second fuel injection start timing control map 242A where the fuel injection start timing TS is defined which corresponds to the rotation speed NA of the engine and the fuel injection period TQ in the stop state of the supercharger 4. The second fuel injection start timing control map 242A is a map different from the first fuel injection start timing control map 241A.

The above-described fuel injection start timing control unit 24 is configured to control the fuel injection start timing TS based on the second association information 241 when it is determined that the supercharger 4 is in the drive state, and is configured to control the fuel injection start timing TS based on the third association information 242 when it is determined that the supercharger 4 is in the stop state.

Figure 8:
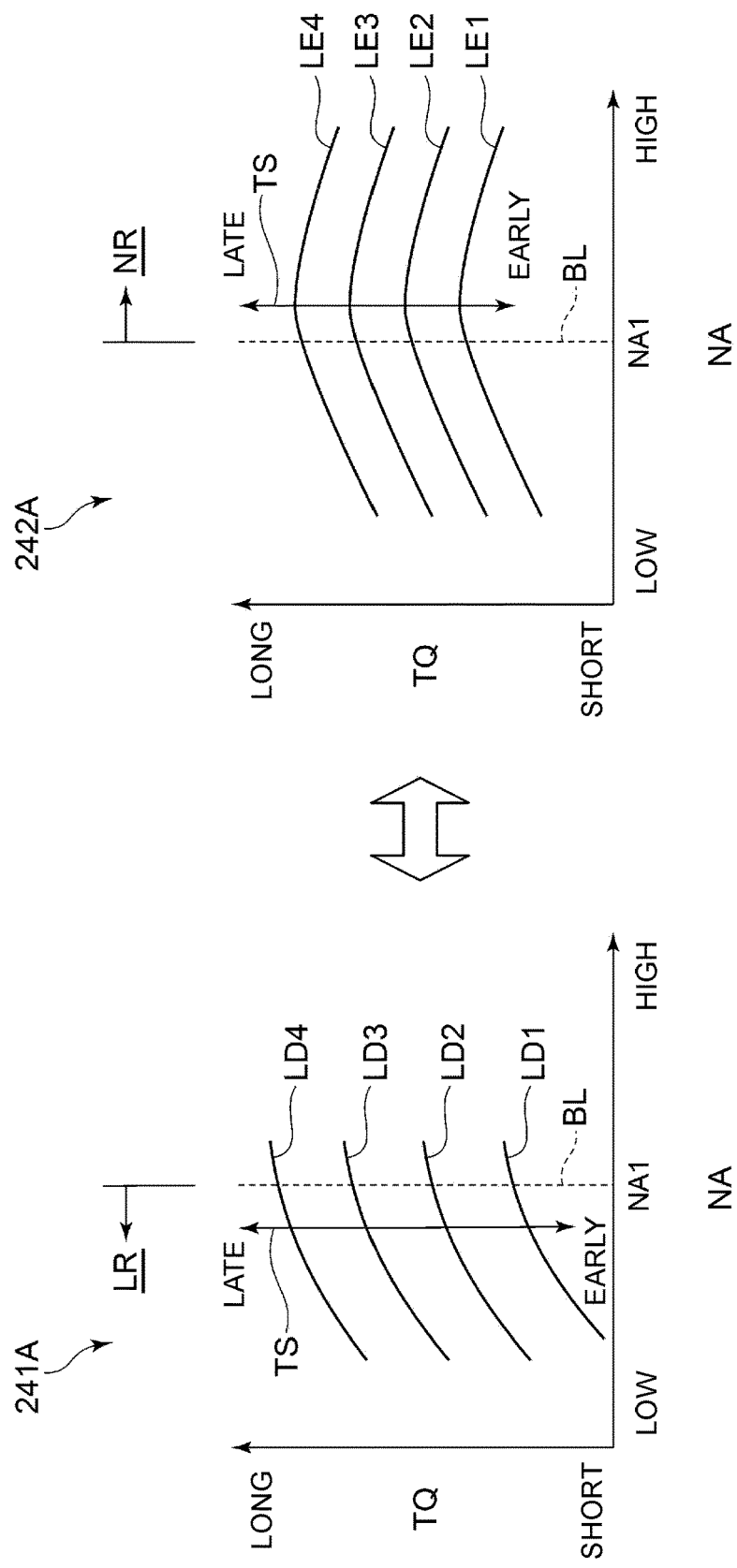
FIG. 8 shows explanatory graphs for describing the control of the fuel injection start timing control unit in an embodiment.

FIG. 8 shows explanatory graphs for describing the control of the fuel injection start timing control unit in an embodiment. FIG. 8 shows the two fuel injection start timing control maps 241A and 242A in which the rotation speed NA of the engine 5 is plotted on the horizontal axis and the fuel injection period TQ is plotted on the vertical axis. The first fuel injection start timing control map 241A shows a plurality of curves LD1, LD2, LD3, and LD4 representing the relationship between the rotation speed NA of the engine 5 and the fuel injection period TQ for each fuel injection start timing TS (injection crank angle) with respect to the engine 5. The second fuel injection start timing control map 242A shows a plurality of curves LE1, LE2, LE3, and LE4 representing the relationship between the rotation speed NA of the engine 5 and the fuel injection period TQ for each fuel injection start timing TS (injection crank angle) with respect to the engine 5.

The fuel injection start timing control unit 24 obtains, with the position on the first fuel injection start timing control map 241A, the fuel injection start timing TS corresponding to the rotation speed NA of the engine 5 and the fuel injection period TQ from the rotation speed NA and the fuel injection period TQ, when it is determined that the supercharger 4 is in the drive state. The fuel injection start timing control unit 24 obtains, with the position on the second fuel injection start timing control map 242A, the fuel injection start timing TS corresponding to the rotation speed NA of the engine 5 and the fuel injection period TQ from the rotation speed NA and the fuel injection period TQ, when it is determined that the supercharger 4 is in the stop state. The fuel injection start timing control unit 24 uses the control maps 241A and 242A that differ depending on the operating state of the supercharger 4 to calculate the fuel injection start timing TS corresponding to the rotation speed NA of the engine 5 and the fuel injection period TQ, and instructs the fuel injection device 13 to start injecting the liquid fuel at the calculated fuel injection start timing TS.

It is set such that at least one of the torque TA, the fuel consumption rate FER, or the scavenging pressure SP of the engine 5 in the second fuel injection start timing control map 242A (third association information 242) is the same as that in the first start timing control map 241A (second association information 241) or a difference in at least one of the torque TA, the fuel consumption rate FER, or the scavenging pressure SP of the engine 5 between the second fuel injection start timing control map 242A (third association information 242) and the first start timing control map 241A (second association information 241) is small, when the operating state of the supercharger 4 is switched (for example, when the rotation speed NA is equal to the set value NA1).

Since there is the correlation between the fuel injection period TQ and the fuel injection amount, the fuel injection amount may be used instead of the fuel injection period TQ as a parameter in the fuel injection start timing control step S103 (fuel injection start timing control unit 24). Further, it is only necessary that the second association information 241 or the third association information 242 is information that uses the rotation speed NA of the engine 5 and the fuel injection period TQ (or the fuel injection amount) as input information and can output the fuel injection start timing TS corresponding to the input information, and the second association information 241 or the third association information 242 includes a list, a table, a map, a function, a machine learning model, or the like indicating a correspondence relationship between the above-described input information and the above-described output information. The second association information 241 or the third association information 242 may be created based on routine test data, or may be created based on past performance values, experimental values, numerical analysis results, etc. other than the routine test data.

With the above configuration, since the fuel injection start timing control unit 24 controls the fuel injection start timing TS based on the association information 241, 242 which is different depending on the operating state (the drive state or the stop state) of the supercharger 4 determined by the fuel injection start timing control unit 24, the fuel injection start timing TS can be the appropriate timing according to the operating state of the supercharger 4. The fuel consumption rate FER or the torque TA of the engine 5 can be changed by changing the fuel injection start timing TS with respect to the engine 5 by the fuel injection start timing control unit 24. Since the fuel injection start timing control unit 24 changes the fuel injection start timing TS with respect to the engine 5 such that the fuel consumption rate FER or the torque TA of the engine 5 after the operating state of the supercharger 4 changes is the same as the fuel consumption rate FER or the torque TA of the engine before the operating state of the supercharger 4 changes, it is possible to suppress the fluctuation in the fuel consumption rate FER or the torque TA of the engine 5, which can be caused when the operating state of the supercharger 4 changes. By suppressing the fluctuation in the fuel consumption rate FER or the torque TA of the engine 5, which can be caused when the operating state of the supercharger 4 changes, the driver's accelerator adjustment for keeping the torque TA constant becomes unnecessary. Further, with the above configuration, the control of the fuel injection period TQ by the fuel injection period control unit 23 may not be changed, making it possible to suppress the complication of the control in the control system 2.

In some embodiments, the above-described second association information 241 includes the first fuel injection start timing control map 241A where the fuel injection start timing TS is defined in accordance with the rotation speed NA of the engine and the fuel injection period TQ. The above-described third association information 242 includes the second fuel injection start timing control map 242A where the fuel injection start timing TS is defined in accordance with the rotation speed NA of the engine and the fuel injection period TQ. The second fuel injection start timing control map 242A is a map different from the first fuel injection start timing control map 241A.

With the above configuration, since the fuel injection start timing control unit 24 controls the fuel injection start timing TS based on the control map 241A, 242A which is different depending on the operating state (the drive state or the stop state) of the supercharger 4 determined by the fuel injection start timing control unit 24, the fuel injection start timing TS can be the appropriate timing according to the operating state of the supercharger 4 and it is possible to effectively suppress the fluctuation in the fuel consumption rate FER or the torque TA of the engine 5, which can be caused when the operating state of the supercharger 4 changes. Further, the fuel injection start timing control unit 24 controls the fuel injection start timing TS by a mapping method using the control map 241A, 242A, making it possible to suppress the complication of the control in the fuel injection start timing control unit 24 and thus to suppress the complication of the control in the control system 2.

(Determination Method 1 for Operating State of Supercharger)

In some embodiments, in the above-described control method 100, the control map 241A, 242A to be referred to in the fuel injection start timing control step S103 is switched in response to the change in the rotation speed NA of the engine 5 in step S113, as indicated by single-dotted chain lines in FIG. 2. The above-described fuel injection start timing control unit 24 switches the control map 241A, 242A to be used to control the fuel injection start timing TS, in response to the change in the rotation speed NA of the engine 5 measured by the rotation speed sensor 26, as indicated by a single-dotted chain line in FIG. 3.

In the embodiment shown in FIG. 3, the above-described fuel injection start timing control unit 24 is configured to take in the rotation speed NA of the engine 5 as a determination index of the operating state of the supercharger 4, and is configured to determine that the operating state of the supercharger 4 is changed when the rotation speed NA of the engine 5 passes the set value NA1. In the present embodiment, the fuel injection start timing control unit 24 (fuel injection start timing control step S103) determines that the operating state of the supercharger 4 is changed when the rotation speed NA of the engine 5 passes the set value NA1, and switches the control map 241A, 242A (association information 241, 242) used to control the fuel injection start timing TS. With the above configuration, no consideration is given to time delay from when the instruction to switch the state of the clutch 16 is issued to the clutch 16 by the clutch control unit 22 to when switching of the operating state (the drive state or the stop state) of the supercharger 4 is completed (for example, to when the supercharger 4 can rotate in accordance with the rotation speed NA of the engine 5 without slipping, after the clutch 16 is engaged), a time difference may occur between when the control map 241A, 242A is switched and when the state of the supercharger 4 is switched, compared to a determination method for the operating state of the supercharger 4, which will be described later.

(Determination Method 2 for Operating State of Supercharger)

Figure 9:
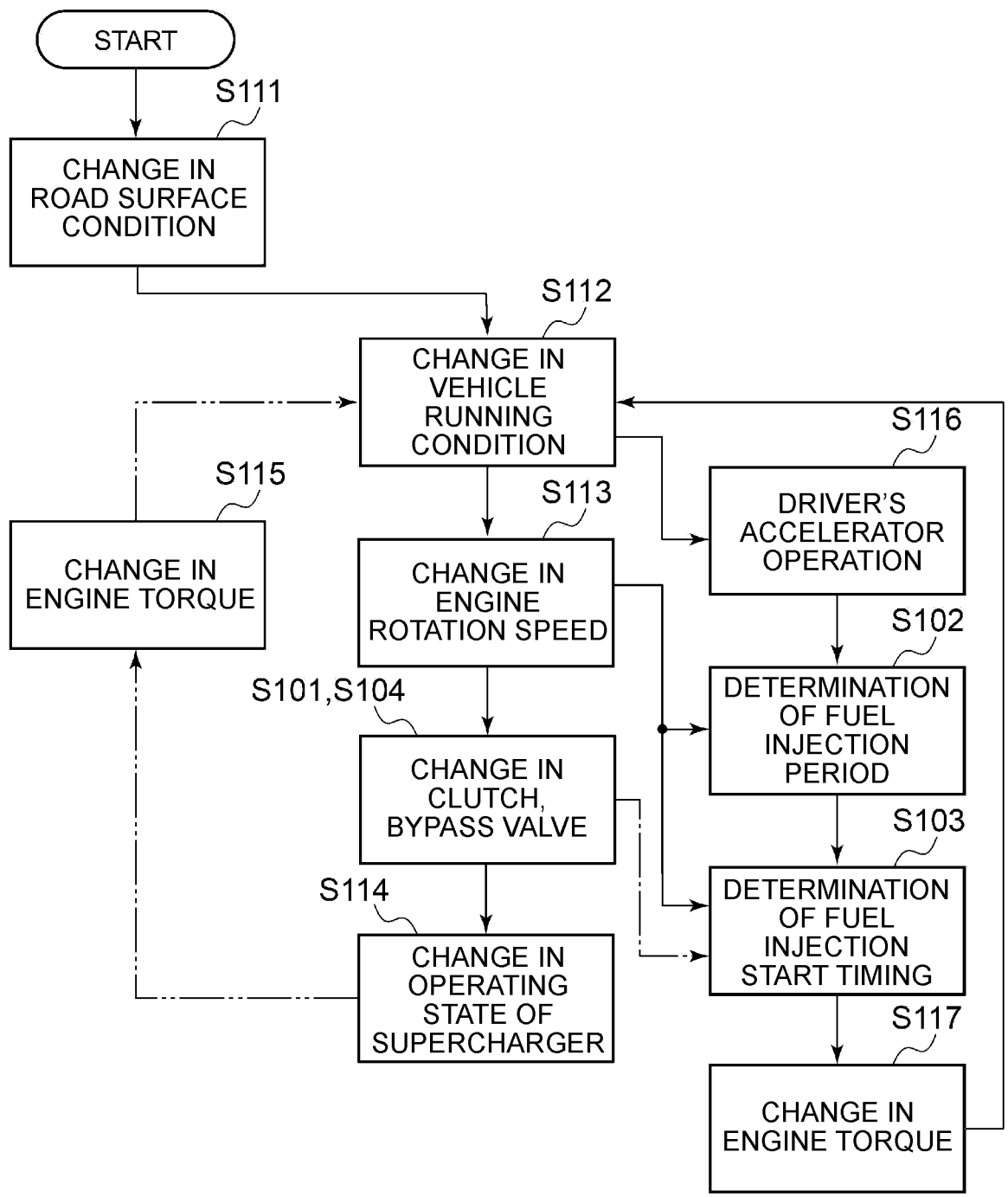
FIG. 9 is a flowchart showing an example of the control method for the diesel engine according to an embodiment of the present disclosure.
Figure 10:
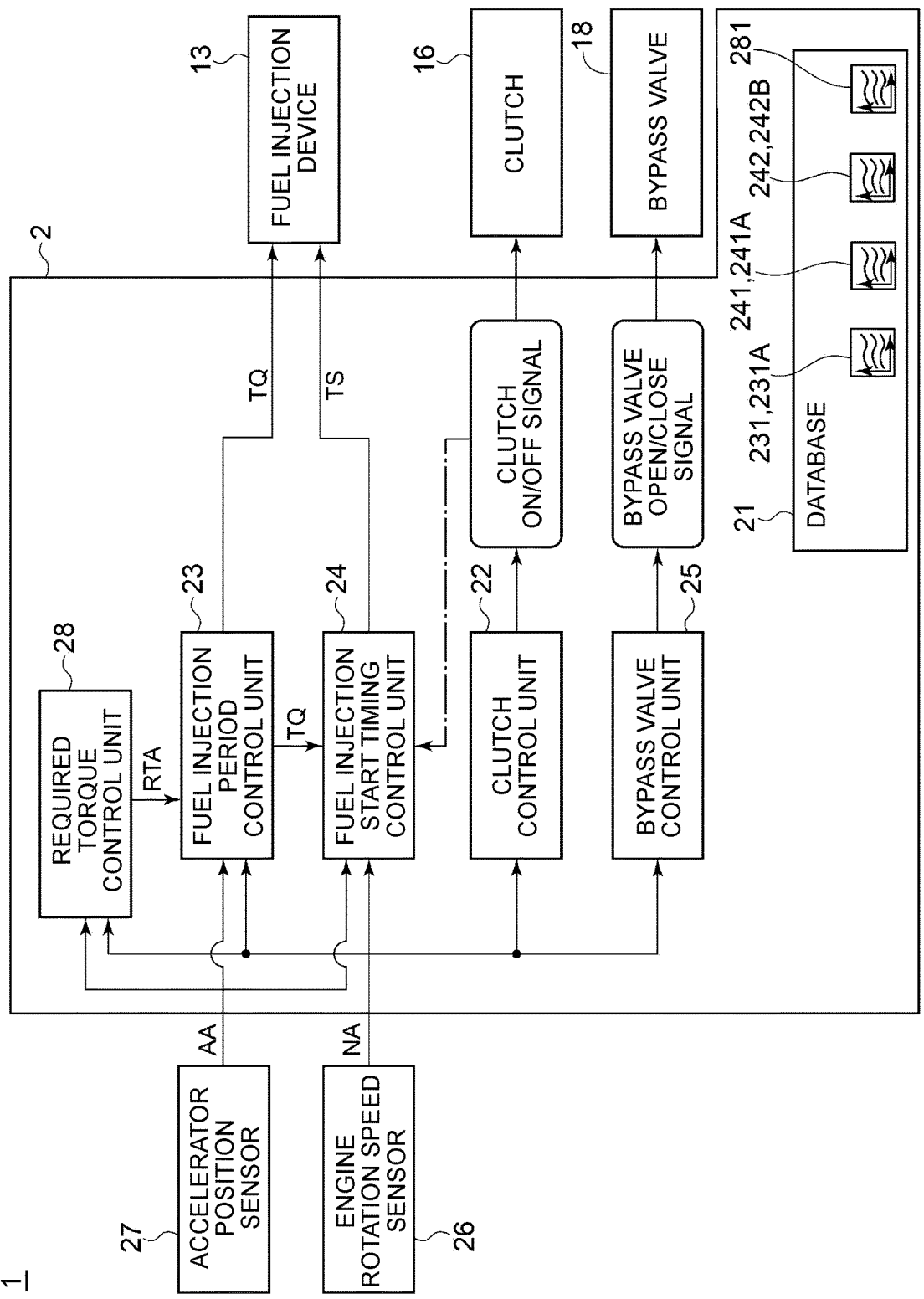
FIG. 10 is an explanatory diagram for describing the function of the control system for the diesel engine according to an embodiment of the present disclosure.

FIG. 9 is a flowchart showing an example of the control method for the diesel engine according to an embodiment of the present disclosure. FIG. 10 is a flowchart showing an example of the control method for the diesel engine according to an embodiment of the present disclosure.

In some embodiments, the control map 241A, 242A to be referred to in the fuel injection start timing control step S103 is switched in response to the change in state (the engaged state or the disengaged state) of the clutch 16 in the clutch switch step S101 described above, as indicated by single-dotted chain lines in FIG. 9. The above-described fuel injection start timing control unit 24 switches the control map 241A, 242A to be used to control the fuel injection start timing TS, in response to the change in instruction signal (clutch ON/OFF signal) sent from the clutch control unit 22 of the control system 2 to the clutch 16, as indicated by a single-dotted chain line in FIG. 10.

In the embodiment shown in FIG. 10, the above-described control system 2 is configured to transmit a signal for issuing an instruction on the state of engagement or disengagement of the clutch 16 from the clutch control unit 22 to the clutch 16. The above-described fuel injection start timing control unit 24 is configured to take in the instruction signal from the clutch control unit 22 to the clutch 16 as a determination index of the operating state of the supercharger 4 as indicated by the single-dotted chain line in FIG. 10, and is configured to determine that the operating state of supercharger 4 is changed in accordance with the instruction signal for the clutch 16 by the clutch control unit 22 of the control system 2. In the present embodiment, the fuel injection start timing control unit 24 (fuel injection start timing control step S103) determines that the operating state of the supercharger 4 is changed when the instruction signal from the clutch control unit 22 to the clutch 16 is switched, and switches the control map 241A, 242A used to control the fuel injection start timing TS.

Figure 11:
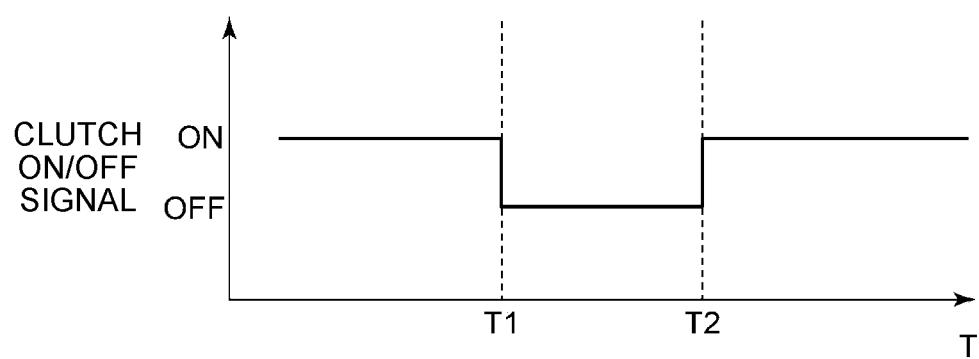
FIG. 11 is an explanatory graph for describing a determination method for an operating state of a supercharger in an embodiment.

FIG. 11 is an explanatory graph for describing a determination method for the operating state of the supercharger in an embodiment. FIG. 11 shows a change, for each elapsed time, in instruction signal (clutch ON/OFF signal) sent from the clutch control unit 22 of the control system 2 to the clutch 16, with the elapsed time T being plotted on the horizontal axis and the instruction signal being plotted on the vertical axis. The fuel injection start timing control unit 24 determines that the operating state of the supercharger 4 is switched from the drive state to the stop state, and switches the control map used to control the fuel injection start timing TS from 241A to 242A, when the instruction signal sent from the clutch control unit 22 to the clutch 16 changes from the ON signal to the OFF signal (T1 in the figure). Further, the fuel injection start timing control unit 24 determines that the operating state of the supercharger 4 is switched from the stop state to the drive state, and switches the control map used to control the fuel injection start timing TS from 242A to 241A, when the instruction signal sent from the clutch control unit 22 to the clutch 16 changes from the OFF signal to the ON signal (T2 in the figure).

With the above configuration, the instruction signal transmitted from the control system 2 to the clutch 16 is different depending on whether the supercharger 4 is in the drive state or in the stop state. Since the fuel injection start timing control unit 24 determines that the operating state of the supercharger 4 is changed in accordance with the instruction signal from the control system 2 to the clutch 16, switching of the control of the fuel injection start timing TS (switching of the control map 241A, 242A used for the control) is performed at a more appropriate timing that considers the time delay in switching of the operating state (the drive state or the stop state) of the supercharger 4, compared to the case where it is determined that the operating state of the supercharger 4 is changed in accordance with the rotation speed NA of the engine 5. Therefore, it is possible to suppress the time difference that can occur between when the control of the fuel injection start timing TS is switched and when the operating state of the supercharger 4 is switched. Whereby, the fuel injection start timing control unit 24 can make the fuel injection start timings TS before and after the operating state of the supercharger 4 changes more appropriate, and can more effectively suppress the fluctuation in the fuel consumption rate FER or the torque TA of the engine 5, which can be caused when the operating state of the supercharger 4 changes.

(Determination Method 3 for Operating State of Supercharger)

Figure 12:
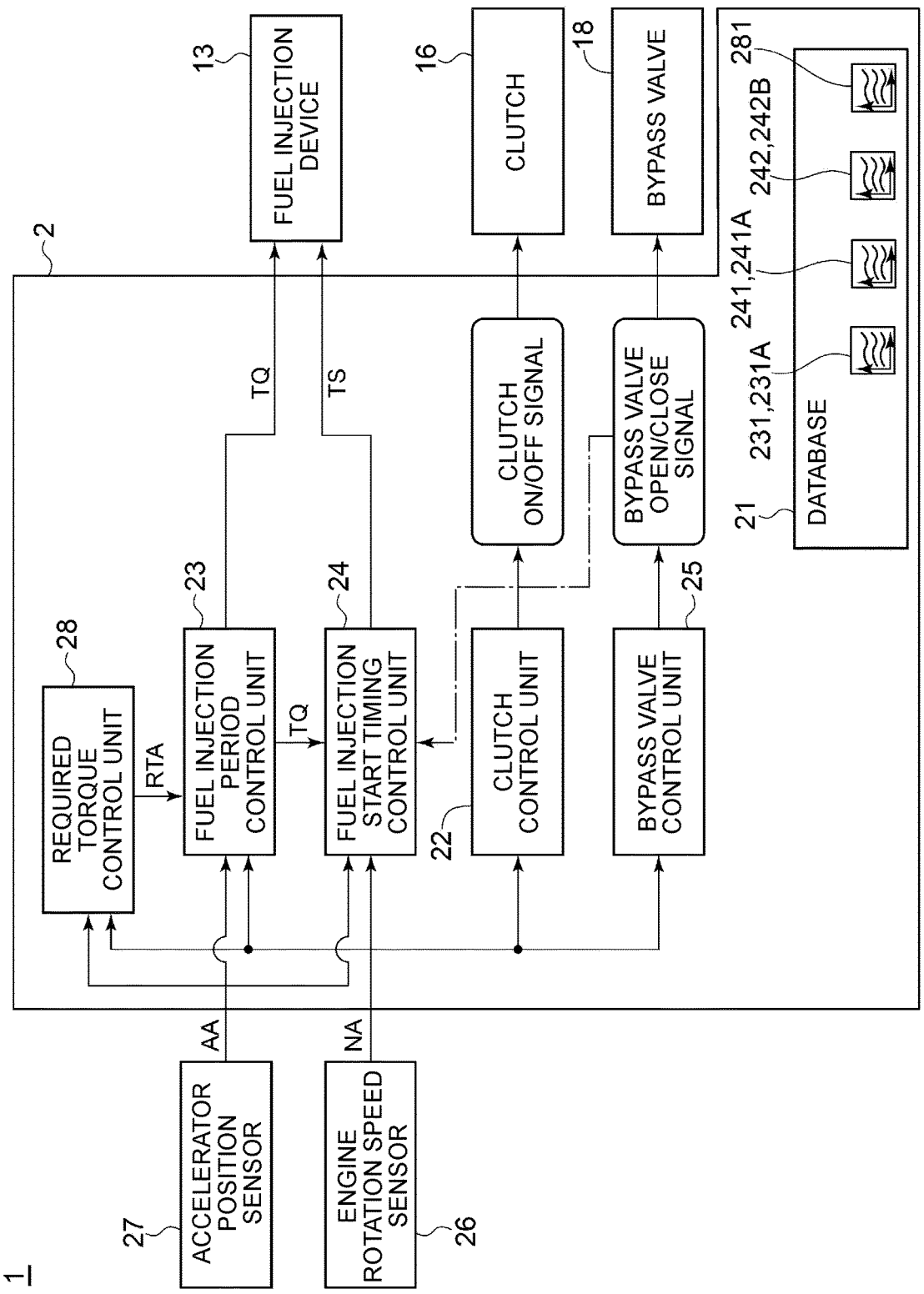
FIG. 12 is an explanatory diagram for describing the function of the control system for the diesel engine according to an embodiment of the present disclosure.

FIG. 12 is a flowchart showing an example of the control method for the diesel engine according to an embodiment of the present disclosure.

In some embodiments, in the above-described control method 100, the control map 241A, 242A to be referred to in the fuel injection start timing control step S103 is switched in response to the change in state (the open state or the closed state) of the bypass valve 18 in the bypass valve control step S104, as indicated by the single-dotted chain lines in FIG. 9. The above-described fuel injection start timing control unit 24 switches the control map 241A, 242A to be used to control the fuel injection start timing TS, in response to the change in open/close instruction signal (open/close signal) sent from the bypass valve control unit 25 of the control system 2 to the bypass valve 18, as indicated by a single-dotted chain line in FIG. 12.

In the embodiment shown in FIG. 12, the above-described control system 2 is configured to transmit a signal for issuing an instruction to open/close the bypass valve 18 from the bypass valve control unit 25 to the bypass valve 18. The above-described fuel injection start timing control unit 24 is configured to take in the instruction signal from the bypass valve control unit 25 to the bypass valve 18 as a determination index of the operating state of the supercharger 4 as indicated by the single-dotted chain line in FIG. 12, and is configured to determine that the operating state of supercharger 4 is changed in accordance with the instruction signal for the bypass valve 18 by the bypass valve control unit 25 of the control system 2. In the present embodiment, the fuel injection start timing control unit 24 (fuel injection start timing control step S103) determines that the operating state of the supercharger 4 is changed when the instruction signal from the bypass valve control unit 25 to the bypass valve 18 is switched, and switches the control map 241A, 242A used to control the fuel injection start timing TS.

Figure 13:
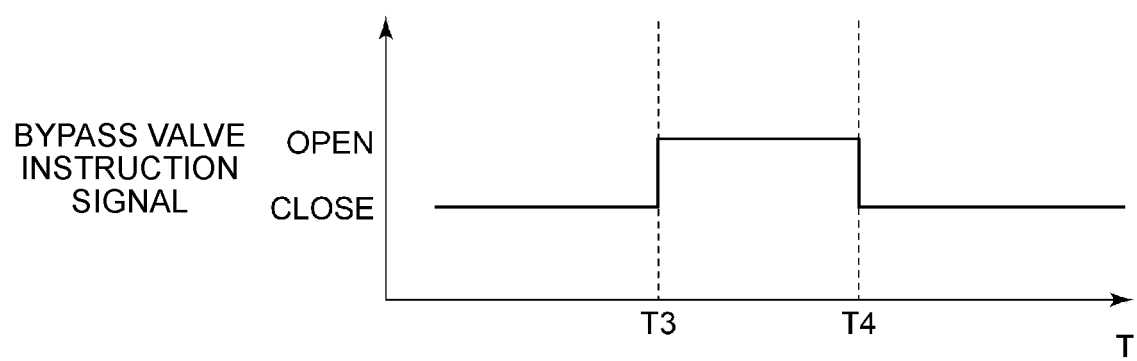
FIG. 13 is an explanatory graph for describing the determination method for the operating state of the supercharger in an embodiment.

FIG. 13 is an explanatory graph for describing a determination method for the operating state of the supercharger in an embodiment. FIG. 13 shows a change, for each elapsed time, in instruction signal (OPEN/CLOSE signal) sent from the bypass valve control unit 25 of the control system 2 to the bypass valve 18, with the elapsed time T being plotted on the horizontal axis and the instruction signal being plotted on the vertical axis. The fuel injection start timing control unit 24 determines that the operating state of the supercharger 4 is switched from the drive state to the stop state, and switches the control map used to control the fuel injection start timing TS from 241A to 242A, when the instruction signal sent from the bypass valve control unit 25 to the bypass valve 18 changes from CLOSE signal to OPEN signal (T3 in the figure). Further, the fuel injection start timing control unit 24 determines that the operating state of the supercharger 4 is switched from the stop state to the drive state, and switches the control map used to control the fuel injection start timing TS from 242A to 241A, when the instruction signal sent from the bypass valve control unit 25 to the bypass valve 18 changes from OPEN signal to CLOSE signal (T4 in the figure).

With the above configuration, the instruction signal transmitted from the control system 2 to the bypass valve 18 is different depending on whether the supercharger 4 is in the drive state or in the stop state. Since the fuel injection start timing control unit 24 determines that the operating state of the supercharger 4 is changed in accordance with the instruction signal from the control system 2 to the bypass valve 18, switching of the control of the fuel injection start timing TS (switching of the control map 241A, 242A) is performed at a more appropriate timing that considers the time delay in switching of the operating state (the drive state or the stop state) of the supercharger 4, compared to the case where it is determined that the operating state of the supercharger 4 is changed based on the rotation speed NA of the engine 5. Therefore, it is possible to suppress the time difference that can occur between when the control of the fuel injection start timing TS is switched and when the operating state of the supercharger 4 is switched. Whereby, the fuel injection start timing control unit 24 can make the fuel injection start timings TS before and after the operating state of the supercharger 4 changes more appropriate, and can more effectively suppress the fluctuation in the fuel consumption rate FER or the torque TA of the engine 5, which can be caused when the operating state of the supercharger 4 changes.

(Determination Method 4 for Operating State of Supercharger)

Figure 14:
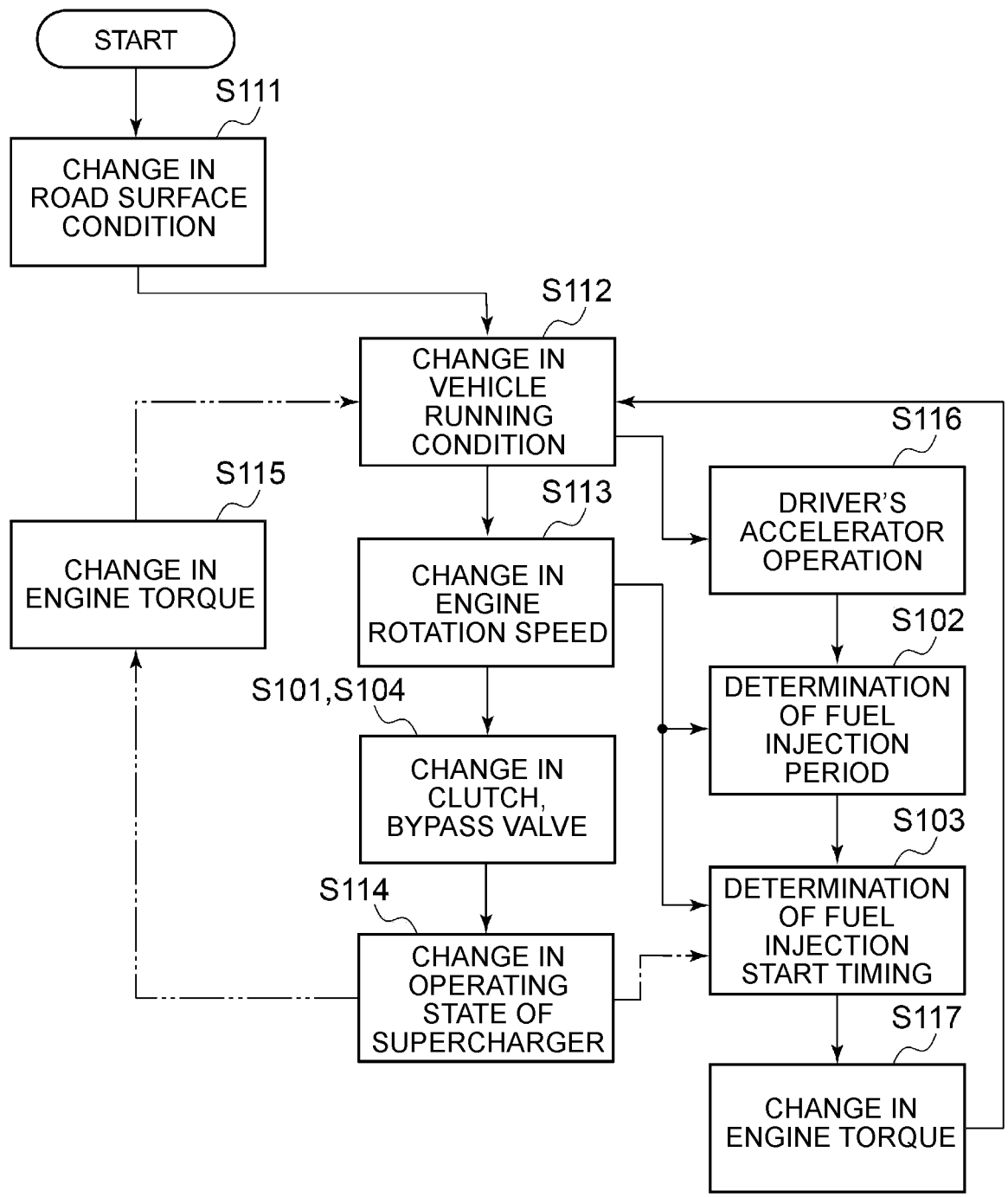
FIG. 14 is a flowchart showing an example of the control method for the diesel engine according to an embodiment of the present disclosure.
Figure 15:
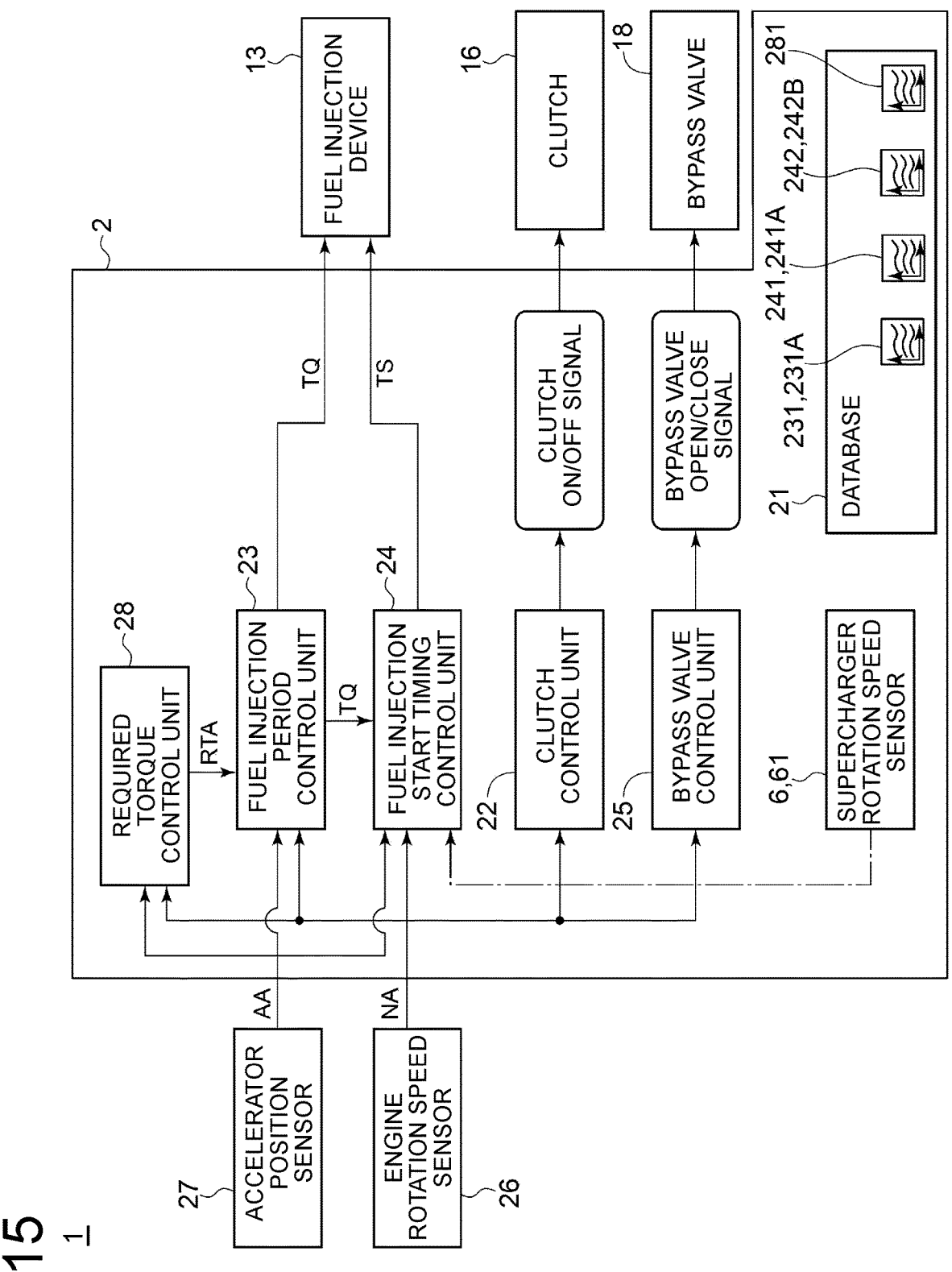
FIG. 15 is an explanatory diagram for describing the function of the control system for the diesel engine according to an embodiment of the present disclosure.

FIG. 14 is a flowchart showing an example of the control method for the diesel engine according to an embodiment of the present disclosure. FIG. 15 is a flowchart showing an example of the control method for the diesel engine according to an embodiment of the present disclosure.

In some embodiments, the above-described control system 2 further includes a supercharger rotation speed acquisition device 6 configured to acquire a rotation speed NB of the supercharger 4, as shown in FIG. 15. In the illustrated embodiment, as shown in FIG. 1, 15, the supercharger rotation speed acquisition device 6 includes a rotation speed sensor 61 configured to measure the rotation speed NB of the supercharger 4. In the embodiment shown in FIG. 1, the rotation speed sensor 61 detects the rotation speed of the rotational shaft 43.

In the above-described control method 100, the fuel injection start timing control map 241A, 242A to be referred to in the fuel injection start timing control step S103 is switched in response to the change in operating state of the supercharger 4 in the above-described step S114 (specifically, the rotation speed NB of the supercharger 4 acquired by the supercharger rotation speed acquisition device 6), as indicated by single-dotted chain lines in FIG. 14. The above-described fuel injection start timing control unit 24 switches the control map 241A, 242A to be used to control the fuel injection start timing TS, in response to the change in the rotation speed NB of the supercharger 4 measured by the rotation speed sensor 61, as indicated by a single-dotted chain line in FIG. 15.

In the embodiment shown in FIG. 15, the above-described fuel injection start timing control unit 24 is configured to take in the rotation speed NB of the supercharger 4 as a determination index of the operating state of the supercharger 4, and is configured to determine that the operating state of the supercharger 4 is changed, based on a preset threshold RNB of the rotation speed NB of the supercharger 4 and the rotation speed NB of the supercharger 4 acquired by the supercharger rotation speed acquisition device 6. In the present embodiment, the fuel injection start timing control unit 24 (fuel injection start timing control step S103) determines that the operating state of the supercharger 4 is changed when the rotation speed NB of the supercharger 4 acquired by the supercharger rotation speed acquisition device 6 exceeds the threshold RNB, and switches the control map 241A, 242A used to control the fuel injection start timing TS.

Figure 16:
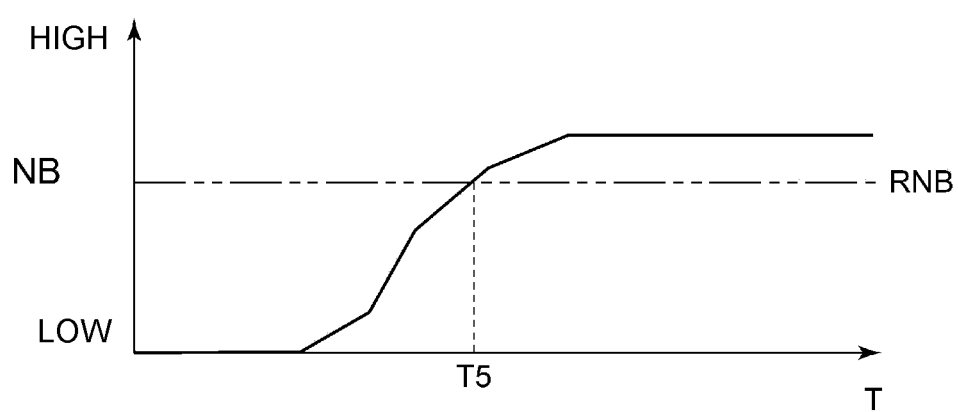
FIG. 16 is an explanatory graph for describing the determination method for the operating state of the supercharger in an embodiment.

FIG. 16 is an explanatory graph for describing a determination method for the operating state of the supercharger in an embodiment. FIG. 16 shows the change in the rotation speed NB acquired by the supercharger rotation speed acquisition device 6 (acquired rotation speed), with the elapsed time T being plotted on the horizontal axis and the rotation speed NB of the supercharger 4 being plotted on the vertical axis. As shown in FIG. 16, since the clutch 16 slips immediately after the clutch 16 is engaged, the rotation speed NB of the supercharger 4 gently increases. Then, as the slipping of the clutch 16 disappears, the rotation speed NB of the supercharger 4 increases. The threshold RNB is preset to a value corresponding to the rotation speed NB of the supercharger 4 in a state where the clutch 16 no longer slips and the supercharger 4 rotates in accordance with the rotation of the engine 5. The fuel injection start timing control unit 24 determines that the operating state of the supercharger 4 is switched from the stop state to the drive state when the rotation speed NB acquired by the supercharger rotation speed acquisition device 6 exceeds the threshold RNB (T5 in the figure), and switches the control map used to control the fuel injection start timing TS from 242A to 241A. Further, the fuel injection start timing control unit 24 determines that the operating state of the supercharger 4 is switched from the drive state to the stop state when the rotation speed NB acquired by the supercharger rotation speed acquisition device 6 falls below the threshold RNB, and switches the control map used to control the fuel injection start timing TS from 241A to 242A.

With the above configuration, the fuel injection start timing control unit 24 determines that the operating state of the supercharger 4 is changed in accordance with the rotation speed NB of the supercharger 4 acquired by the supercharger rotation speed acquisition device 6. In this case, switching of the control of the fuel injection start timing TS is performed at a more appropriate timing that considers the time delay in switching of the operating state (the drive state or the stop state) of the supercharger 4, compared to the case where it is determined that the operating state of the supercharger 4 is changed in accordance with the rotation speed NA of the engine 5. Therefore, it is possible to suppress the time difference that can occur between when the control of the fuel injection start timing TS is switched and when the state of the supercharger 4 is switched. Whereby, the fuel injection start timing control unit 24 can make the fuel injection start timings TS before and after the operating state of the supercharger 4 changes more appropriate, and can more effectively suppress the fluctuation in the fuel consumption rate FER or the torque TA of the engine 5, which can be caused when the operating state of the supercharger 4 changes.

(Determination Method 5 for Operating State of Supercharger)

Figure 17:
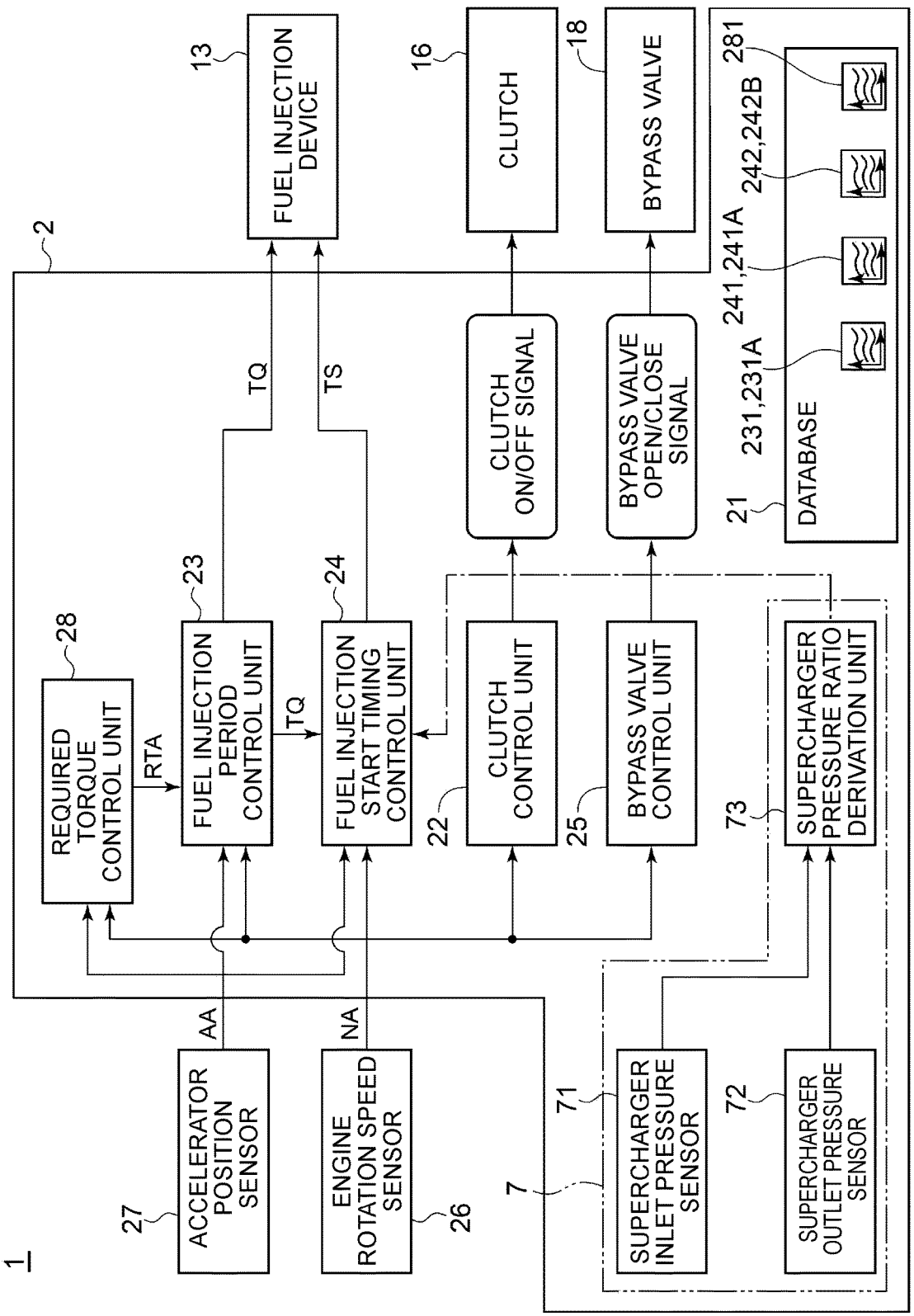
FIG. 17 is an explanatory diagram for describing the function of the control system for the diesel engine according to an embodiment of the present disclosure.

FIG. 17 is an explanatory diagram for describing a function of the control system for the diesel engine according to an embodiment of the present disclosure.

In some embodiments, the above-described control system 2 further includes a supercharger pressure ratio acquisition device 7 configured to acquire a pressure ratio PR of the supercharger 4, as shown in FIG. 17. In the illustrated embodiment, as shown in FIG. 1, 17, the supercharger pressure ratio acquisition device 7 includes an inlet pressure sensor 71 configured to measure an inlet pressure of the supercharger 4, and an outlet pressure sensor 72 configured to measure an outlet pressure of the supercharger 4. As shown in FIG. 17, the supercharger pressure ratio acquisition device 7 further includes a supercharger pressure ratio derivation unit 73 configured to calculate the pressure ratio PR of the supercharger 4 from the inlet pressure of the supercharger 4 measured by the inlet pressure sensor 71 and the outlet pressure measured by the outlet pressure sensor 72.

In the embodiment shown in FIG. 1, the inlet pressure sensor 71 measures the pressure of the intake air flowing downstream of the branch section 111 of the first intake passage 11A and upstream of the impeller 41. The outlet pressure sensor 72 measures the pressure on the downstream side of the impeller 41 on the first intake passage 11A. The outlet pressure sensor 72 may measure the intake air flowing upstream of the confluent section 112 of the first intake passage 11A, or may measure the intake air flowing downstream of the confluent section 112 of the first intake passage 11A.

In the above-described control method 100, the fuel injection start timing control map 241A, 242A to be referred to in the fuel injection start timing control step S103 is switched in response to the change in operating state of the supercharger 4 in the above-described step S114 (specifically, the pressure ratio PR of the supercharger 4 acquired by the supercharger pressure ratio acquisition device 7), as indicated by the single-dotted chain lines in FIG. 14. The above-described fuel injection start timing control unit 24 switches the control map 241A, 242A to be used to control the fuel injection start timing TS, in response to the change in the pressure ratio PR of the supercharger 4 acquired by the supercharger pressure ratio acquisition device 7, as indicated by single-dotted chain lines in FIG. 17.

In the embodiment shown in FIG. 17, the above-described fuel injection start timing control unit 24 is configured to take in the pressure ratio PR of the supercharger 4 as a determination index of the operating state of the supercharger 4, and is configured to determine that the clutch 16 is switched, based on a preset threshold RPR of the pressure ratio PR of the supercharger 4 and the pressure ratio PR of the supercharger 4 acquired by the supercharger pressure ratio acquisition device 7. In the present embodiment, the fuel injection start timing control unit 24 (fuel injection start timing control step S103) determines that the operating state of the supercharger 4 is changed when the pressure ratio PR of the supercharger 4 acquired by the supercharger pressure ratio acquisition device 7 exceeds the threshold RPR, and switches the control map 241A, 242A used to control the fuel injection start timing TS.

Figure 18:
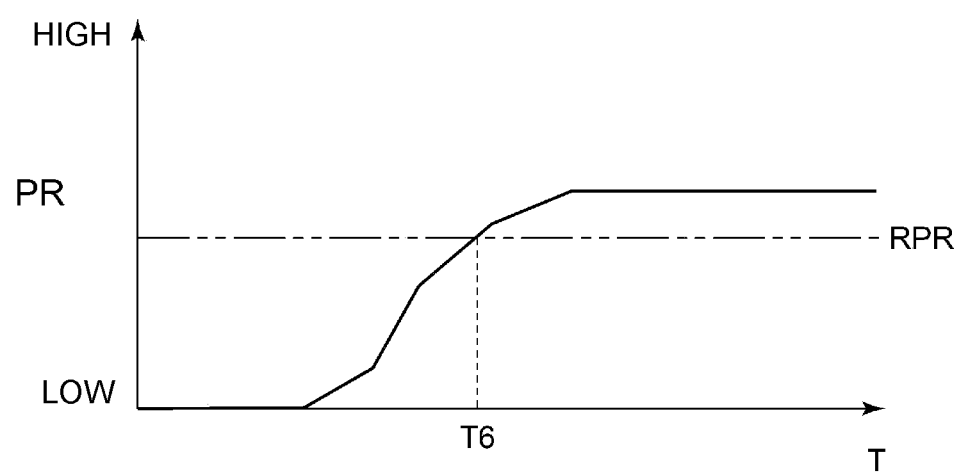
FIG. 18 is an explanatory graph for describing the determination method for the operating state of the supercharger in an embodiment.

FIG. 18 is an explanatory graph for describing a determination method for the operating state of the supercharger in an embodiment. FIG. 18 shows the change in the pressure ratio PR acquired by the supercharger pressure ratio acquisition device 7 (acquired pressure ratio), with the elapsed time T being plotted on the horizontal axis and the pressure ratio PR of the supercharger 4 being plotted on the vertical axis. As shown in FIG. 18, since the clutch 16 slips immediately after the clutch 16 is engaged, the rotation speed NB of the supercharger 4 gently increases and the pressure ratio PR increases as the rotation speed NB increases. Then, as the slipping of the clutch 16 disappears, the rotation speed NB and the pressure ratio PR of the supercharger 4 increase. The threshold RPR is preset to a value corresponding to the pressure ratio PR of the supercharger 4 in a state where the clutch 16 no longer slips and the supercharger 4 rotates in accordance with the rotation of the engine 5. The fuel injection start timing control unit 24 determines that the operating state of the supercharger 4 is switched from the stop state to the drive state when the pressure ratio PR acquired by the supercharger pressure ratio acquisition device 7 exceeds the threshold RPR (T6 in the figure), and switches the control map used to control the fuel injection start timing TS from 242A to 241A. Further, the fuel injection start timing control unit 24 determines that the operating state of the supercharger 4 is switched from the drive state to the stop state when the pressure ratio PR acquired by the supercharger pressure ratio acquisition device 7 falls below the threshold RPR, and switches the control map used to control the fuel injection start timing TS from 241A to 242A.

With the above configuration, the fuel injection start timing control unit 24 determines that the operating state of the supercharger 4 is changed in accordance with the pressure ratio PR of the supercharger 4 acquired by the supercharger pressure ratio acquisition device 7. In this case, switching of the control of the fuel injection start timing TS is performed at a more appropriate timing that considers the time delay in switching of the operating state (the drive state or the stop state) of the supercharger 4, compared to the case where it is determined that the operating state of the supercharger 4 is changed in accordance with the rotation speed NA of the engine 5. Therefore, it is possible to suppress the time difference that can occur between when the control of the fuel injection start timing TS is switched and when the state of the supercharger 4 is switched. Whereby, the fuel injection start timing control unit 24 can make the fuel injection start timings TS before and after the operating state of the supercharger 4 changes more appropriate, and can more effectively suppress the fluctuation in the fuel consumption rate FER or the torque TA of the engine 5, which can be caused when the operating state of the supercharger 4 changes.

As shown in FIG. 1, the diesel engine 1 according to some embodiments includes the above-described control system 2. With the above configuration, the diesel engine 1 can suppress the fluctuation in the fuel consumption rate FER or the torque TA of the engine 5, which can be caused when the operating state of the supercharger 4 changes, while suppressing the complication of the control in the control system 2. By suppressing the fluctuation in the fuel consumption rate FER or the torque TA of the engine 5, which can be caused when the operating state of the supercharger 4 changes, the driver's accelerator adjustment for keeping the torque TA constant becomes unnecessary.

The present disclosure is not limited to the above-described embodiments, and also includes an embodiment obtained by modifying the above-described embodiments or an embodiment obtained by combining these embodiments as appropriate.

The contents described in some embodiments described above would be understood as follows, for instance.

1) A control system (2) for a diesel engine (1) according to at least one embodiment of the present disclosure is a control system (2) for a diesel engine (1) including a turbocharger (3) and a supercharger (4) as superchargers, including: a clutch control unit (22) for switching a state of engagement or disengagement of a clutch (16) interposed between the supercharger (4) and a drive shaft (53) of the engine; a fuel injection period control unit (23) for controlling a fuel injection period (TQ) with respect to the engine based on first association information (231) in which a rotation speed (NA) of the engine, an accelerator position (AA), and the fuel injection period (TQ) are associated with each other in advance; and a fuel injection start timing control unit (24) for controlling a fuel injection start timing (TS) with respect to the engine. The control system (2) includes: second association information (241) in which the rotation speed (NA) of the engine, the fuel injection period (TQ), and the fuel injection start timing (TS) are associated with each other in advance, in a drive state of the supercharger (4); and third association information (242) in which the rotation speed (NA) of the engine, the fuel injection period (TQ), and the fuel injection start timing (TS) are associated with each other in advance, in a stop state of the supercharger (4), the third association information (242) being different from the second association information (241). The fuel injection start timing control unit (24) is configured to control the fuel injection start timing (TS) based on the second association information (241) when the supercharger (4) is in the drive state, and is configured to control the fuel injection start timing (TS) based on the third association information (242) when the supercharger (4) is in the stop state.

With the above configuration 1), the fuel consumption rate or the torque of the engine can be changed by changing the fuel injection start timing (TS) with respect to the engine by the fuel injection start timing control unit (24). Since the fuel injection start timing control unit (24) changes the fuel injection start timing (TS) with respect to the engine such that the fuel consumption rate or the torque of the engine after the state of the clutch (16) is switched is the same as the fuel consumption rate or the torque of the engine before the state of the clutch (16) is switched, it is possible to suppress the fluctuation in the fuel consumption rate or the torque of the engine, which can be caused when the state of the clutch (16) is switched. Since the fluctuation in the fuel consumption rate or the torque of the engine, which can be caused when the state of the clutch (16) is switched, the driver's accelerator adjustment for keeping the torque constant becomes unnecessary. Further, with the above configuration 1), the control of the fuel injection period (TQ) by the fuel injection period control unit (23) may not be changed, making it possible to suppress the complication of the control in the control system (2).

With the above configuration 1), since the fuel injection start timing control unit (24) controls the fuel injection start timing (TS) based on the association information (the second association information 241, the third association information 242) which is different depending on the operating state (the drive state or the stop state) of the supercharger (4), the fuel injection start timing TS can be an appropriate timing according to the operating state of the supercharger (4). The fuel consumption rate or the torque of the engine can be changed by changing the fuel injection start timing (TS) with respect to the engine by the fuel injection start timing control unit (24). Since the fuel injection start timing control unit (24) changes the fuel injection start timing (TS) with respect to the engine such that the fuel consumption rate or the torque of the engine after the operating state of the supercharger (4) changes is the same as the fuel consumption rate or the torque of the engine before the operating state of the supercharger (4) changes, it is possible to suppress the fluctuation in the fuel consumption rate or the torque of the engine, which can be caused when the operating state of the supercharger (4) changes. By suppressing the fluctuation in the fuel consumption rate or the torque of the engine, which can be caused when the operating state of the supercharger (4) changes, the driver's accelerator adjustment for keeping the torque constant becomes unnecessary. Further, with the above configuration 1), the control of the fuel injection period (TQ) by the fuel injection period control unit (23) may not be changed, making it possible to suppress the complication of the control in the control system (2).

2) In some embodiments, in the control system (2) for the diesel engine (1) as defined in the above 1), wherein the second association information (241) includes a first fuel injection start timing control map (241A) where the fuel injection start timing (TS) is defined in accordance with the rotation speed (NA) of the engine and the fuel injection period (TQ), and wherein the third association information (242) includes a second fuel injection start timing control map (242A) where the fuel injection start timing (TS) is defined in accordance with the rotation speed (NA) of the engine and the fuel injection period (TQ).

With the above configuration 2), since the fuel injection start timing control unit (24) controls the fuel injection start timing (TS) based on the fuel injection start timing control map (the first fuel injection start timing control map 241A, the second fuel injection start timing control map 242A) which is different depending on the operating state (the drive state or the stop state) of the supercharger (4), the fuel injection start timing (TS) can be the appropriate timing according to the operating state of the supercharger (4) and it is possible to effectively suppress the fluctuation in the fuel consumption rate or the torque of the engine, which can be caused when the operating state of the supercharger (4) changes. Further, the fuel injection start timing control unit (24) controls the fuel injection start timing (TS) by a mapping method using the fuel injection start timing control map (241A, 242A), making it possible to suppress the complication of the control in the fuel injection start timing control unit (24) and thus to suppress the complication of the control in the control system (2).

3) In some embodiments, in the control system (2) for the diesel engine (1) as defined in the above 1) or 2), wherein the control system (2) is configured to transmit a signal for issuing an instruction on the state of engagement or disengagement of the clutch (16) to the clutch (16), and wherein the fuel injection start timing control unit (24) is configured to determine that an operating state of the supercharger (4) is changed in accordance with the signal instructed by the control system (2) to the clutch (16).

With the above configuration 3), since the fuel injection start timing control unit (24) determines that the operating state of the supercharger (4) is changed in accordance with the signal from the clutch (16), switching of the control of the fuel injection start timing (TS) is performed at a more appropriate timing that considers the time delay in switching of the operating state (the drive state or the stop state) of the supercharger (4), compared to the case where it is determined that the operating state of the supercharger (4) is changed in accordance with the rotation speed (NA) of the engine. Whereby, the fuel injection start timing control unit (24) can make the fuel injection start timings (TS) before and after the operating state of the supercharger (4) changes more appropriate, and can more effectively suppress the fluctuation in the fuel consumption rate or the torque of the engine, which can be caused when the operating state of the supercharger (4) changes.

4) In some embodiments, in the control system (2) for the diesel engine (1) as defined in the above 1) or 2), wherein the control system (2) is configured to transmit a signal for issuing an instruction to open/close a bypass valve (18) to the bypass valve (18) which is disposed on a bypass passage (11B) bypassing the supercharger (4) and connecting the engine (5) and a compressor (32) of the turbocharger (3), and is configured to open/close the bypass passage (11B), and wherein the fuel injection start timing control unit (24) is configured to determine that an operating state of the supercharger (4) is changed in accordance with the signal instructed by the control system (2) to the bypass valve (18).

With the above configuration 4), since the fuel injection start timing control unit (24) determines that the operating state of the supercharger (4) is changed in accordance with the instruction signal from the control system (2) to the bypass valve (18), switching of the control of the fuel injection start timing (TS) is performed at a more appropriate timing that considers the time delay in switching of the operating state (the drive state or the stop state) of the supercharger (4), compared to the case where it is determined that the operating state of the supercharger (4) is changed based on based on the rotation speed (NA) of the engine (5). Therefore, it is possible to suppress the time difference that can occur between when the control of the fuel injection start timing TS is switched and when the operating state of the supercharger 4 is switched. Whereby, the fuel injection start timing control unit (24) can make the fuel injection start timings (TS) before and after the operating state of the supercharger (4) changes more appropriate, and can more effectively suppress the fluctuation in the fuel consumption rate (FER) or the torque (TA) of the engine (5), which can be caused when the operating state of the supercharger (4) changes.

5) In some embodiments, the control system (2) for the diesel engine (1) as defined in the above 1) or 2), further includes a supercharger rotation speed acquisition device (6) configured to acquire a rotation speed (NB) of the supercharger (4). The fuel injection start timing control unit (24) is configured to determine that an operating state of the supercharger (4) is changed in accordance with the rotation speed (NB) of the supercharger (4) acquired by the supercharger rotation speed acquisition device (6).

With the above configuration 5), the fuel injection start timing control unit (24) determines that the operating state of the supercharger (4) is changed in accordance with the rotation speed (NB) of the supercharger (4) acquired by the supercharger rotation speed acquisition device (6). In this case, switching of the control of the fuel injection start timing (TS) is performed at a more appropriate timing that considers the time delay in switching of the operating state (the drive state or the stop state) of the supercharger (4), compared to the case where it is determined that the operating state of the supercharger (4) is changed in accordance with the rotation speed (NA) of the engine. Whereby, the fuel injection start timing control unit (24) can make the fuel injection start timings (TS) before and after the operating state of the supercharger (4) changes more appropriate, and can more effectively suppress the fluctuation in the fuel consumption rate or the torque of the engine, which can be caused when the operating state of the supercharger (4) changes.

6) In some embodiments, the control system (2) for the diesel engine (1) as defined in the above 1) or 2), further includes a supercharger pressure ratio acquisition device (7) configured to acquire a pressure ratio (PR) of the supercharger (4). The fuel injection start timing control unit (24) is configured to determine that an operating state of the supercharger (4) is changed in accordance with the pressure ratio (PR) of the supercharger (4) acquired by the supercharger pressure ratio acquisition device (7).

With the above configuration 6), the fuel injection start timing control unit (24) determines that the operating state of the supercharger (4) is changed in accordance with the pressure ratio (PR) of the supercharger (4) acquired by the supercharger pressure ratio acquisition device (7). In this case, switching of the control of the fuel injection start timing (TS) is performed at a more appropriate timing that considers the time delay in switching of the operating state (the drive state or the stop state) of the supercharger (4), compared to the case where it is determined that the operating state of the supercharger (4) is changed in accordance with the rotation speed (NA) of the engine. Whereby, the fuel injection start timing control unit (24) can make the fuel injection start timings (TS) before and after the operating state of the supercharger (4) changes more appropriate, and can more effectively suppress the fluctuation in the fuel consumption rate or the torque of the engine, which can be caused when the operating state of the supercharger (4) changes.

7) A diesel engine (1) according to at least one embodiment of the present disclosure, includes the control system (2) for the diesel engine (1) as defined in any of the above 1) to 6).

With the above configuration 7), the above-described diesel engine (1) can suppress the fluctuation in the fuel consumption rate or the torque of the engine, which can be caused when the operating state of the supercharger (4) changes, while suppressing the complication of the control in the control system (2) for the diesel engine. By suppressing the fluctuation in the fuel consumption rate or the torque of the engine, which can be caused when the operating state of the supercharger (4) changes, the driver's accelerator adjustment for keeping the torque constant becomes unnecessary.

8) A control method (100) for a diesel engine (1) according to at least one embodiment of the present disclosure is a control method (2) for a diesel engine (1) including a turbocharger (3) and a supercharger (4) as superchargers, including: a clutch switch step (S101) of switching a state of engagement or disengagement of a clutch (16) interposed between the supercharger (4) and a drive shaft (53) of the engine; a fuel injection period control step (S102) of controlling a fuel injection period (TQ) with respect to the engine based on first association information (231) in which a rotation speed (NA) of the engine, an accelerator position (AA), and the fuel injection period (TQ) are associated with each other in advance; and a fuel injection start timing control step (S103) of controlling a fuel injection start timing (TS) with respect to the engine. The fuel injection start timing control step (S103) includes: a first fuel injection start timing control step of controlling the fuel injection start timing (TS) when the supercharger (4) is in a drive state, based on second association information (241) in which the rotation speed (NA) of the engine, the fuel injection period (TQ), and the fuel injection start timing (TS) are associated with each other in advance, in the drive state of the supercharger (4); and a second fuel injection start timing control step of controlling the fuel injection start timing (TS) when the supercharger (4) is in a stop state, based on third association information (242) in which the rotation speed (NA) of the engine, the fuel injection period (TQ), and the fuel injection start timing (TS) are associated with each other in advance, in the stop state of the supercharger (4), the third association information (242) being different from the second association information (241).

With the above method 8), since the fuel injection start timing control step (S103) includes controlling the fuel injection start timing (TS) based on the association information (the second association information 241, the third association information 242) which is different depending on the operating state (the drive state or the stop state) of the supercharger (4), the fuel injection start timing (TS) can be an appropriate timing according to the operating state of the supercharger (4). The fuel consumption rate or the torque of the engine can be changed by changing the fuel injection start timing (TS) with respect to the engine in the fuel injection start timing control step (S103). Since the fuel injection start timing control step (S103) includes changing the fuel injection start timing (TS) with respect to the engine such that the fuel consumption rate or the torque of the engine after the operating state of the supercharger (4) changes is the same as the fuel consumption rate or the torque of the engine before the operating state of the supercharger (4) changes, it is possible to suppress the fluctuation in the fuel consumption rate or the torque of the engine, which can be caused when the operating state of the supercharger (4) changes. By suppressing the fluctuation in the fuel consumption rate or the torque of the engine, which can be caused when the operating state of the supercharger (4) changes, the driver's accelerator adjustment for keeping the torque constant becomes unnecessary. Further, with the above method, 8) the control of the fuel injection period (TQ) in the fuel injection period control step (S102) may not be changed, making it possible to suppress the complication of the above-described control method (100).

REFERENCE SIGNS LIST

1 Diesel engine
2 Control system
3 Turbocharger
4 Supercharger
5 Engine body
6 Supercharger rotation speed acquisition device
7 Supercharger pressure ratio acquisition device
11 Intake line
11A First intake passage
11B Second intake passage
12 Exhaust line
13 Fuel injection device
14 Fuel supply line
15 Combustion chamber
16 Clutch
17 Gear mechanism
18 Bypass valve
19 Intercooler
21 Database unit
22 Clutch control unit
23 Fuel injection period control unit
24 Fuel injection start timing control unit
25 Bypass valve control unit 26 Rotation speed sensor
27 Accelerator sensor
28 Required torque control unit
31 Rotational shaft
32 Compressor
33 Turbine
34 Impeller
35 Compressor housing
36 Turbine rotor
37 Turbine housing
41 Impeller
42 Housing
43 Rotational shaft
51 Cylinder
52 Piston
53 Drive shaft
61 Rotation speed sensor
71 Inlet pressure sensor
72 Outlet pressure sensor
73 Supercharger pressure ratio derivation unit
100 Control method
111 Branch section
112 Confluent section
231 First association information
231A Fuel injection period map
241 Second association information
241A First fuel injection start timing control map
242 Third association information
242A Second fuel injection start timing control map
281 Torque map
AA Accelerator position
BL Boundary line
FER Fuel consumption rate
LR Low-flow operating region
NA Rotation speed of engine
NB Rotation speed of supercharger
NR Normal operating region
PR Pressure ratio
S101 Clutch switch step
S102 Fuel injection period control step
S103 Fuel injection start timing control step
S104 Bypass valve control step
SP Scavenging pressure
T Elapsed time
TA Torque
TQ Fuel injection period
TS Fuel injection start timing

The invention claimed is:

1. A control system for a diesel engine including a turbocharger and a supercharger as superchargers, comprising:
a clutch control unit for switching a state of engagement or disengagement of a clutch interposed between the supercharger and a drive shaft of the engine;
a fuel injection period control unit for controlling a fuel injection period with respect to the engine based on first association information in which a rotation speed of the engine, an accelerator position, and the fuel injection period are associated with each other in advance; and
a fuel injection start timing control unit for controlling a fuel injection start timing with respect to the engine,
wherein the control system includes:
second association information in which the rotation speed of the engine, the fuel injection period, and the fuel injection start timing are associated with each other in advance, in a drive state of the supercharger; and
third association information in which the rotation speed of the engine, the fuel injection period, and the fuel injection start timing are associated with each other in advance, in a stop state of the supercharger, the third association information being different from the second association information, and
wherein the fuel injection start timing control unit is configured to control the fuel injection start timing based on the second association information when the supercharger is in the drive state, and is configured to control the fuel injection start timing based on the third association information when the supercharger is in the stop state.

2. The control system for the diesel engine according to claim 1,
wherein the second association information includes a first fuel injection start timing control map where the fuel injection start timing is defined in accordance with the rotation speed of the engine and the fuel injection period, and
wherein the third association information includes a second fuel injection start timing control map where the fuel injection start timing is defined in accordance with the rotation speed of the engine and the fuel injection period.

3. The control system for the diesel engine according to claim 1,
wherein the control system is configured to transmit a signal for issuing an instruction on the state of engagement or disengagement of the clutch to the clutch, and
wherein the fuel injection start timing control unit is configured to determine that an operating state of the supercharger is changed in accordance with the signal instructed by the control system to the clutch.

4. The control system for the diesel engine according to claim 1,
wherein the control system is configured to transmit a signal for issuing an instruction to open/close a bypass valve to the bypass valve which is disposed on a bypass passage bypassing the supercharger and connecting the engine and a compressor of the turbocharger, and is configured to open/close the bypass passage, and
wherein the fuel injection start timing control unit is configured to determine that an operating state of the supercharger is changed in accordance with the signal instructed by the control system to the bypass valve.

5. The control system for the diesel engine according to claim 1, further comprising a supercharger rotation speed acquisition device configured to acquire a rotation speed of the supercharger,
wherein the fuel injection start timing control unit is configured to determine that an operating state of the supercharger is changed in accordance with the rotation speed of the supercharger acquired by the supercharger rotation speed acquisition device.

6. The control system for the diesel engine according to claim 1, further comprising a supercharger pressure ratio acquisition device configured to acquire a pressure ratio of the supercharger,
wherein the fuel injection start timing control unit is configured to determine that an operating state of the supercharger is changed in accordance with the pressure ratio of the supercharger acquired by the supercharger pressure ratio acquisition device.

7. A diesel engine comprising the control system according to claim 1.

8. A control method for a diesel engine including a turbocharger and a supercharger as superchargers, comprising:
- a clutch switch step of switching a state of engagement or disengagement of a clutch interposed between the supercharger and a drive shaft of the engine;
- a fuel injection period control step of controlling a fuel injection period with respect to the engine based on first association information in which a rotation speed of the engine, an accelerator position, and the fuel injection period are associated with each other in advance; and
- a fuel injection start timing control step of controlling a fuel injection start timing with respect to the engine,
- wherein the fuel injection start timing control step includes:
- a first fuel injection start timing control step of controlling the fuel injection start timing when the supercharger is in a drive state, based on second association information in which the rotation speed of the engine, the fuel injection period, and the fuel injection start timing are associated with each other in advance, in the drive state of the supercharger; and
- a second fuel injection start timing control step of controlling the fuel injection start timing when the supercharger is in a stop state, based on third association information in which the rotation speed of the engine, the fuel injection period, and the fuel injection start timing are associated with each other in advance, in the stop state of the supercharger, the third association information being different from the second association information.

* * * * *